US010891674B2

(12) United States Patent
Yonaha

(10) Patent No.: US 10,891,674 B2
(45) Date of Patent: Jan. 12, 2021

(54) SEARCH APPARATUS, SEARCH SYSTEM AND SEARCH METHOD

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 335 days.

(21) Appl. No.: 15/913,725

(22) Filed: Mar. 6, 2018

(65) Prior Publication Data
US 2018/0218424 A1  Aug. 2, 2018

Related U.S. Application Data

(63) Continuation of application No. PCT/JP2016/073548, filed on Aug. 10, 2016.

(30) Foreign Application Priority Data

Sep. 7, 2015 (JP) ................. 2015-175646

(51) Int. Cl.
*G06Q 30/06* (2012.01)
*G06F 16/9535* (2019.01)
(Continued)

(52) U.S. Cl.
CPC ......... *G06Q 30/0625* (2013.01); *G06F 16/00* (2019.01); *G06F 16/24578* (2019.01);
(Continued)

(58) Field of Classification Search
CPC .............................................. G06G 30/06–08
(Continued)

(56) References Cited

U.S. PATENT DOCUMENTS

| 8,738,468 B2 * | 5/2014 | Lifson ................ G06Q 10/10 705/26.7 |
| 9,600,840 B1 * | 3/2017 | Pope ................. G06Q 30/0631 |
| 2013/0084000 A1 * | 4/2013 | Bhardwaj ............. G06T 7/41 382/165 |

FOREIGN PATENT DOCUMENTS

CN      101083504 B  *  9/2011
JP      2010-020490 A     1/2010
(Continued)

OTHER PUBLICATIONS

Data Science, Recommendation matrix as a product of user similarity and ratings https://datascience.stackexchange.com/questions/17194/recommendation-matrix-as-a-product-of-user-similarity-and-rating, Feb, 26, 2017 (Year: 2017).*

(Continued)

*Primary Examiner* — Ming Shui
(74) *Attorney, Agent, or Firm* — Studebaker & Brackett PC

(57) ABSTRACT

A first product ID indicating a first product relevant to purchase action history information of one user and a second product ID indicating a second product handled by a store are acquired. Based on the first product corresponding to the acquired first product ID and the second product corresponding to the acquired second product ID, the preference suitability between the preference of the user and the preference of the store is calculated for each store. The preference suitability is calculated by calculating the similarity between a first design feature amount obtained by analyzing a product image showing the first product and a second design feature amount obtained by analyzing a product image showing the second product. Then, a store having a high preference suitability among the preference suitabilities calculated for respective stores is searched for as a store handling a large number of his or her favorite products.

15 Claims, 16 Drawing Sheets

[PRODUCT DB 24]

| PRODUCT ID | CATEGORY | PRODUCT IMAGE | DESIGN FEATURE AMOUNT | | | | SENSIBILITY SPACE COORDINATES | EC SITE (STORE ID) | BRAND | STOCK | SIZE | PRICE | OTHERS |
|---|---|---|---|---|---|---|---|---|---|---|---|---|---|
| | | | COLOR | PATTERN | SHAPE | TEXTURE | | | | | | | |
| ⋮ | ⋮ | ⋮ | ⋮ | ⋮ | ⋮ | ⋮ | ⋮ | ⋮ | ⋮ | ⋮ | ⋮ | ⋮ | ⋮ |
| 3451 | TOPS | | { HSV #10 | PATTERN SIZE – PATTERN DENSITY – | COLLAR SHAPE V NECK | GLOSSINESS – TRANSPARENCY – | { X = 1XX X = X2X | | A COMPANY | THREE LEFT | M | – | ON BARGAIN SALE |
| 3452 | BOTTOMS | | { HSV #19 } { HSV #39 } | PATTERN SIZE – PATTERN DENSITY – | FINENESS/ THICKNESS | GLOSSINESS – TRANSPARENCY – | { X = 5XX X = XX9 | | C COMPANY | ONE LEFT | FREE | – | TO BE SOLD (12/1.2015) |
| ⋮ | ⋮ | ⋮ | ⋮ | ⋮ | ⋮ | ⋮ | ⋮ | ⋮ | ⋮ | ⋮ | ⋮ | ⋮ | ⋮ |

(51) Int. Cl.
   *G06F 16/2457*    (2019.01)
   *G06Q 30/02*      (2012.01)
   *G06F 16/00*      (2019.01)
   *G06K 9/62*       (2006.01)

(52) U.S. Cl.
   CPC ....... *G06F 16/9535* (2019.01); *G06K 9/6202* (2013.01); *G06K 9/6215* (2013.01); *G06Q 30/02* (2013.01)

(58) Field of Classification Search
   USPC .............................................. 705/26.1–27.2
   See application file for complete search history.

(56) References Cited

FOREIGN PATENT DOCUMENTS

| | | |
|---|---|---|
| JP | 2011-096025 A | 5/2011 |
| JP | 2014-215915 A | 11/2014 |

OTHER PUBLICATIONS

A Singular Value Decomposition Approach for Recommendation Systems, Osman Nurġ Osmanl, Masters Thesis, available at https://citeseerx.ist.psu.edu/viewdoc/download?doi=10.1.1.633.1787&rep=rep1&type=pdf, Jul. 2010. (Year: 2010).*

International Search Report issued in PCT/JP2016/073548; dated Oct. 11, 2016.

International Preliminary Report on Patentability and Written Opinion issued in PCT/JP2016/073548; dated Mar. 13, 2018.

* cited by examiner

FIG. 3

[USER DB 16]

| USER ID | PRODUCT ID REGISTERED AS FAVORITES | PRODUCT ID DISPLAYED IN DETAIL | PRODUCT ID PUT IN CART | PRODUCT ID REGISTERED IN MY CLOSET | ACTION RANGE INFORMATION |
|---|---|---|---|---|---|
| ... | ... | ... | ... | ... | ... |
| 0891 | 2437, 1987, ... | 7947, 5439, 6550, ... | - | 7947, 5439, 6550, ... | TOKYO ⇔ KAWASAKI ⇔ YOKOHAMA |
| 0892 | 6976, ... | 2568, 0866, ... | 0876, ... | 1954, 2947, 4783, 0749, 3424, ... | OMIYA ⇔ AKABANE ⇔ SHINJUKU |
| 0893 | (SAME HEREINBELOW) | (SAME HEREINBELOW) | (SAME HEREINBELOW) | (SAME HEREINBELOW) | (SAME HEREINBELOW) |
| 0894 | | | | | |
| ... | ... | ... | ... | ... | ... |

FIG. 4

[STORE DB 20]

| STORE ID | STORE NAME | ADDRESS, TEL | BRAND | PRICE RANGE | HANDLING PRODUCT ID |
|---|---|---|---|---|---|
| ... | ... | ... | ... | ... | ... |
| 0441 | ○○○ SHINJUKU STORE | SHINJUKU-KU, TOKYO ... 03-xxx-xxxx | ABC, XYZ, ... | 2,000 YEN TO 8,000 YEN | 6704, 4324, 9722, 1098, 7382, 3245, 9181, 0098, ... |
| 0442 | △□☆ SHIBUYA STORE | SHIBUYA-KU, TOKYO ... 03-xxx-xxxx | α β γ, θ ε ω, ... | 10,000 YEN TO 20,000 YEN | 2304, 4764, 9452, 1998, 7562, 3225, 9771, 0198, ... |
| 0443 | (SAME HEREINBELOW) | (SAME HEREINBELOW) | (SAME HEREINBELOW) | (SAME HEREINBELOW) | (SAME HEREINBELOW) |
| 0444 | ... | ... | ... | ... | ... |

FIG. 5

[PRODUCT DB 24]

| PRODUCT ID | CATEGORY | PRODUCT IMAGE | DESIGN FEATURE AMOUNT ||||| SENSIBILITY SPACE COORDINATES | EC SITE (STORE ID) | BRAND | STOCK | SIZE | PRICE | OTHERS |
| | | | COLOR | PATTERN | SHAPE | TEXTURE | | | | | | | |
|---|---|---|---|---|---|---|---|---|---|---|---|---|---|
| .... | .... | .... | .... | .... | .... | .... | .... | .... | .... | .... | .... | .... | .... |
| 3451 | TOPS | 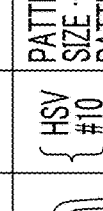 | {HSV #10} | PATTERN SIZE... PATTERN DENSITY... | COLLAR SHAPE V NECK | GLOSSINESS... TRANSPARENCY... | {X = 1XX, X = X2X} | | A COMPANY | THREE LEFT | M | ... | ON BARGAIN SALE |
| 3452 | BOTTOMS | 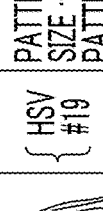 | {HSV #19, HSV #39} | PATTERN SIZE... PATTERN DENSITY... | FINENESS/ THICKNESS | GLOSSINESS... TRANSPARENCY... | {X = 5XX, X = XX9} | | C COMPANY | ONE LEFT | FREE | ... | TO BE SOLD (12/1/2015) |
| .... | .... | .... | .... | .... | .... | .... | .... | .... | .... | .... | .... | .... | .... |

SEARCH APPARATUS, SEARCH SYSTEM AND SEARCH METHOD

CROSS-REFERENCE TO RELATED APPLICATIONS

This application is a Continuation of PCT International Application No. PCT/JP2016/073548 filed on Aug. 10, 2016, which claims priority under 35 U.S.C § 119(a) to Japanese Patent Application No. 2015-175646 filed on Sep. 7, 2015. Each of the above application(s) is hereby expressly incorporated by reference, in its entirety, into the present application.

BACKGROUND OF THE INVENTION

1. Field of the Invention

The present invention relates to a search apparatus, a search system, and a search method, and in particular, to a technique capable of easily searching for stores handling a large number of user's favorite products.

2. Description of the Related Art

A technique for recommending a store highly relevant to a user by using the shopping history of the user has been proposed (JP2014-215915A).

A correlation value calculation system disclosed in JP2014-215915A acquires a feature amount for each analysis target item based on an operation history showing the history of the operation of a user (including the history of operations performed by the user on the network (online history)), and calculates a correlation value for the combination of analysis target items based on the degree of similarity between the acquired feature amounts.

In the correlation value calculation system disclosed in JP2014-215915A, for example, it is possible to output a correlation between stores by setting both analysis target items as stores. Therefore, as a store to be recommended to a user having an operation history relevant to a certain store, another store having a high correlation value for the store can be output (paragraph <0036> in JP2014-215915A).

SUMMARY OF THE INVENTION

In the correlation value calculation system disclosed in JP2014-215915A, since the operation history of each user is used as information indicating each user's interest or preference, it is possible to search for stores handling the user's favorite products. However, it is not possible to search for and recommend a new store with no operation history of the user.

In addition, since the feature amount for each analysis target item disclosed in JP2014-215915A is based on the operation history (for example, the number of appearances in the operation history) showing the history of the operation of the user, the feature amount for each analysis target item disclosed in JP2014-215915A is not the design feature amount of a product purchased by the user in the past.

Although JP2014-215915A discloses the calculation of a correlation between stores, there is no description of the calculation of a correlation between a user's favorite product for which store recommendation is to be received and products handled by each store.

The invention has been made in view of such circumstances, and it is an object of the invention to provide a search apparatus, a search system, and a search method capable of easily searching for stores handling a large number of user's favorite products among a large number of stores.

In order to achieve the aforementioned object, a search apparatus according to an aspect of the invention comprises: a first product identification information acquisition unit that acquires, based on user identification information set for each user, first product identification information indicating a first product relevant to purchase action history information of a user corresponding to the user identification information; a second product identification information acquisition unit that acquires, based on store identification information set for each store, second product identification information indicating a second product handled by a store corresponding to the store identification information; and a preference suitability calculation unit that calculates a preference suitability between a preference of the user and a preference of the store based on the first product corresponding to the first product identification information and the second product corresponding to the second product identification information.

According to the aspect of the invention, in a case where the user searches for a store handling his/her favorite product, the first product identification information acquisition unit acquires the first product identification information, which indicates the first product relevant to the purchase action history information of the user corresponding to the user identification information, based on the user identification information. That is, based on the user identification information, the first product identification information indicating the user's favorite product (first product) is acquired based on the purchase action history information of the user (history information or the like put in the online shopping cart). On the other hand, the second product identification information acquisition unit acquires the second product identification information, which indicates a product (second product) handled by a store corresponding to the store identification information, based on the store identification information set for each store. Then, the preference suitability calculation unit calculates the preference suitability between the preference of the user and the preference of the store based on the first product corresponding to the acquired first product identification information and the second product corresponding to the acquired second product identification information.

In the search apparatus according to another aspect of the invention, it is preferable that the preference suitability calculation unit calculates a similarity between a first design feature amount obtained by analyzing a product image showing the first product and a second design feature amount obtained by analyzing a product image showing the second product and calculates the preference suitability between the preference of the user and the preference of the store based on the calculated similarity.

According to another aspect of the invention, the preference suitability calculation unit calculates the similarity between the first design feature amount obtained by analyzing a product image showing the user's favorite first product and the second design feature amount obtained by analyzing a product image showing the second product handled by each store, and calculates the preference suitability between the preference of the user and the preference of the store based on the calculated similarity. Therefore, a store having the calculated preference suitability that is higher is a store handling a larger number of user's favorite products.

In the search apparatus according to still another aspect of the invention, it is preferable that the first product identification information acquisition unit acquires the first product identification information indicating "m" first products assuming that m is an integer of 2 or more, the second product identification information acquisition unit acquires the second product identification information indicating "n" second products assuming that n is an integer of 2 or more, and the preference suitability calculation unit calculates "m×n" similarities between "m" first design feature amounts obtained by analyzing product images showing the "m" first products and "n" second design feature amounts obtained by analyzing product images showing the "n" second products and sets an average value of the calculated "m×n" similarities as the preference suitability.

According to still another aspect of the invention, the preference suitability calculation unit calculates "m×n" similarities using a round robin method based on the first design feature amounts of "m" user's favorite first products and the second design feature amounts of "n" second products handled by the store, and sets the average value of the calculated "m×n" similarities as the preference suitability.

In the search apparatus according to still another aspect of the invention, it is preferable that the first product identification information acquisition unit acquires the first product identification information indicating "m" first products assuming that m is an integer of 2 or more, the second product identification information acquisition unit acquires the second product identification information indicating "n" second products assuming that n is an integer of 2 or more, and the preference suitability calculation unit calculates a first statistic amount of "m" first design feature amounts obtained by analyzing product images showing the "m" first products and a second statistic amount of "n" second design feature amounts obtained by analyzing product images showing the "n" second products and sets a similarity between the calculated first statistic amount and the calculated second statistic amount as the preference suitability.

According to still another aspect of the invention, the preference suitability calculation unit calculates the similarity between the first statistic amount, which is calculated from the first design feature amounts of "m" user's favorite first products and the second statistic amount, which is calculated from the second design feature amounts of "n" second products handled by the store, using a statistic amount comparison method and sets the calculated similarity as the preference suitability between the user and each store. The first statistic amount and the second statistic amount may be calculated in advance (before the search request from the user).

It is preferable that the search apparatus according to still another aspect of the invention further comprises: a user identification information receiving unit that receives user identification information of one user; and a store information providing unit that provides information of stores, which handle a large number of products matching a preference of the user, to the one user. In the search apparatus according to still another aspect of the invention, it is preferable that the first product identification information acquisition unit acquires the first product identification information based on the user identification information of the one user received by the user identification information receiving unit, the second product identification information acquisition unit acquires second product identification information, which indicates a second product handled by each of a plurality of stores, for each of the stores, the preference suitability calculation unit calculates a preference suitability between a preference of the one user and a preference of each of the plurality of stores based on a first product corresponding to the first product identification information and a second product corresponding to the second product identification information for each of the plurality of stores, and the store information providing unit searches for one store or two or more stores having higher preference suitabilities, among the plurality of stores, based on the preference suitability calculated by the preference suitability calculation unit, and provides information of the searched store.

According to still another aspect of the invention, in a case where the user identification information receiving unit receives the user identification information of one user, the store information providing unit provides the one user with the information of one store or two or more stores that handle a large number of products matching the preference of the user and have higher preference suitabilities calculated by the preference suitability calculation unit. As a result, the user can acquire the information of stores handling a large number of user's favorite products (one store or two or more stores having higher preference suitabilities).

It is preferable that the search apparatus according to still another aspect of the invention further comprises a user database in which the first product identification information is registered so as to be associated with the user identification information for each user. It is preferable that the first product identification information acquisition unit acquires the first product identification information, which is registered so as to be associated with the user identification information of the one user, from the user database based on the user identification information of the one user received by the user identification information receiving unit. In the user database, the user identification information and the first product identification information can be registered so as to be associated with each other based on the purchase action history information of the user.

It is preferable that the search apparatus according to still another aspect of the invention further comprises: a store identification information receiving unit that receives store identification information of one store; and a user information providing unit that provides the one store with information of users having high preference suitabilities for a product handled by the store. It is preferable that the first product identification information acquisition unit acquires the first product identification information based on user identification information of each of a plurality of users for each of the users, the second product identification information acquisition unit acquires the second product identification information based on the store identification information of the one store received by the store identification information receiving unit, the preference suitability calculation unit calculates a preference suitability between a preference of each of the plurality of users and a preference of the one store based on a first product corresponding to the first product identification information for each of the plurality of users and a second product corresponding to the second product identification information of the one store, and the user information providing unit searches for one user or two or more users having higher preference suitabilities, among the plurality of users, based on the preference suitability calculated by the preference suitability calculation unit, and provides information of the searched user.

According to still another aspect of the invention, in a case where the store identification information receiving unit receives the store identification information of one store, the user information providing unit provides the one store with the information of one user or two or more users who like products handled by the store and have higher preference suitabilities calculated by the preference suitability calculation unit. As a result, since the store can acquire the information of users (one user or two or more users having higher preference suitabilities) who like products handled by the store, it is possible to efficiently introduce products handled by its own store to users.

It is preferable that the search apparatus according to still another aspect of the invention further comprises a store database in which the second product identification information is registered so as to be associated with the store identification information for each store. It is preferable that the second product identification information acquisition unit acquires the second product identification information, which is registered so as to be associated with the store identification information of the one store, from the store database based on the store identification information of the one store received by the store identification information receiving unit.

In the search apparatus according to still another aspect of the invention, the purchase action history information of the user includes one or more pieces of history information among history information obtained as a result of selecting a product and putting the selected product in an online shopping cart, history information obtained as a result of selecting a product and registering the selected product in a favorites list, history information obtained as a result of selecting a product and browsing detailed display of the selected product, and history information obtained as a result of selecting a product and registering the selected product in my closet.

In the search apparatus according to still another aspect of the invention, the second product handled by the store includes one or more products among a product being sold in the store, a product to be sold, and a product on a bargain sale.

In the search apparatus according to still another aspect of the invention, it is preferable that each of the first design feature amount and the second design feature amount is one or more feature amounts among a color feature amount, a pattern feature amount, a shape feature amount, and a texture feature amount obtained by analyzing product images indicating the first product and the second product. In the case of adopting two or more feature amounts in calculating the preference suitability, it is preferable to weight the similarity for each feature amount calculated based on the two or more feature amounts and set the weighted average similarity as the preference suitability.

In the search apparatus according to still another aspect of the invention, it is preferable that each of the first design feature amount and the second design feature amount is a sensibility feature amount for specifying an impression of the first product and the second product, the sensibility feature amount being associated with one or more feature amounts among a color feature amount, a pattern feature amount, a shape feature amount, and a texture feature amount obtained by analyzing product images indicating the first product and the second product. Here, the sensibility feature amount can be coordinates on the sensibility space expressed in a two-dimensional manner.

It is preferable that the search apparatus according to still another aspect of the invention further comprises a product database in which the first design feature amount and the second design feature amount are registered so as to be associated with the first product identification information and the second product identification information. It is preferable that the preference suitability calculation unit acquires the first design feature amount and the second design feature amount corresponding to the first product identification information and the second product identification information from the product database and calculates a similarity between the acquired first design feature amount and the acquired second design feature amount.

It is preferable that the search apparatus according to still another aspect of the invention further comprises a first charging processing unit that charges a fee to a store whose information is provided in a case where the information of the store is provided by the store information providing unit. This charging is a fee for introducing the store to the user.

It is preferable that the search apparatus according to still another aspect of the invention further comprises a second charging processing unit that charges a fee to a store, to which information of the user is provided, in a case where the information of the user is provided by the user information providing unit. This charging is a fee for introducing the user to the store.

It is preferable that the search apparatus according to still another aspect of the invention further comprises: a user location information acquisition unit that acquires location information of the one user; and a store location information storage unit that stores location information of the plurality of stores. It is preferable that the second product identification information acquisition unit sets a store located within a preset distance from the one user, among the plurality of stores, as a search target store based on the location information of the one user acquired by the user location information acquisition unit and the location information of the plurality of stores and acquires, based on store identification information set for each search target store, second product identification information indicating a second product handled by a store corresponding to the store identification information.

According to still another aspect of the invention, it is possible to add search conditions, such as stores located within a preset distance from the current location of the user, search for one store or two or more stores having higher preference suitabilities among stores (real stores) located within the preset distance from the current location of the user, and provide information of the searched one store or two or more stores.

It is preferable that the search apparatus according to still another aspect of the invention further comprises: an action range information acquisition unit that acquires action range information indicating an action range of the one user; and a store location information storage unit that stores location information of the plurality of stores. It is preferable that the second product identification information acquisition unit sets a store located within the action range of the one user, among the plurality of stores, as a search target store based on the action range information of the one user acquired by the action range information acquisition unit and the location information of the plurality of stores and acquires, based on store identification information set for each search target store, second product identification information indicating a second product handled by a store corresponding to the store identification information.

According to still another aspect of the invention, it is possible to add search conditions, such as stores located within the action range of the user, search for one store or two or more stores having higher preference suitabilities among stores (real stores) located within the action range of the user, and provide information of the searched one store or two or more stores.

A search system according to still another aspect of the invention comprises a user terminal owned by a user and a search server. The user terminal comprises: an operation unit that receives an operation of searching for a store matching a preference; a first transmission unit that transmits user identification information of a user, who is an owner of the user terminal, to the search server based on a search operation in the operation unit; a first reception unit that receives information of one store or two or more stores searched for by the search server; and a display unit that displays information of the stores received by the first reception unit. The search server comprises: a second reception unit that receives user identification information of one user from the user terminal; a first product identification information acquisition unit that acquires first product identification information, which indicates a first product relevant to purchase action history information of a user corresponding to the user identification information, based on the received user identification information; a second product identification information acquisition unit that acquires, based on store identification information set for each store, second product identification information indicating a second product handled by a store corresponding to the store identification information; a preference suitability calculation unit that calculates a preference suitability between a preference of the user and a preference of the store based on a first product corresponding to the first product identification information and a second product corresponding to the second product identification information; a store information providing unit that provides information of stores, which handle a large number of products matching a preference of the user, to the one user and that searches for one store or two or more stores having higher preference suitabilities, among a plurality of stores, based on the preference suitability calculated by the preference suitability calculation unit; and a second transmission unit that transmits information of the searched stores to a user terminal of the one user.

In the search system according to still another aspect of the invention, it is preferable that the preference suitability calculation unit calculates a similarity between a first design feature amount obtained by analyzing a product image showing the first product and a second design feature amount obtained by analyzing a product image showing the second product and calculates the preference suitability between the preference of the user and the preference of the store based on the calculated similarity.

A search method according to still another aspect of the invention comprises: a step in which a first product identification information acquisition unit of a search apparatus acquires, based on user identification information set for each user, first product identification information indicating a first product relevant to purchase action history information of a user corresponding to the user identification information; a step in which a second product identification information acquisition unit of the search apparatus acquires, based on store identification information set for each store, second product identification information indicating a second product handled by a store corresponding to the store identification information; and a step in which a preference suitability calculation unit of the search apparatus calculates a preference suitability between a preference of the user and a preference of the store based on a first product corresponding to the first product identification information and a second product corresponding to the second product identification information.

In the search method according to still another aspect of the invention, it is preferable that, in the step of calculating the preference suitability, a similarity between a first design feature amount obtained by analyzing a product image showing the first product and a second design feature amount obtained by analyzing a product image showing the second product is calculated and the preference suitability between the preference of the user and the preference of the store is calculated based on the calculated similarity.

In the search method according to still another aspect of the invention, it is preferable that the first product identification information acquisition unit acquires the first product identification information indicating "m" first products assuming that m is an integer of 2 or more, the second product identification information acquisition unit acquires the second product identification information indicating "n" second products assuming that n is an integer of 2 or more, and "m×n" similarities between "m" first design feature amounts obtained by analyzing product images showing the "m" first products and "n" second design feature amounts obtained by analyzing product images showing the "n" second products are calculated and an average value of the calculated "m×n" similarities is set as the preference suitability in the step of calculating the preference suitability.

In the search method according to still another aspect of the invention, it is preferable that the first product identification information acquisition unit acquires the first product identification information indicating "m" first products assuming that m is an integer of 2 or more, the second product identification information acquisition unit acquires the second product identification information indicating "n" second products assuming that n is an integer of 2 or more, and a first statistic amount of "m" first design feature amounts obtained by analyzing product images showing the "m" first products and a second statistic amount of "n" second design feature amounts obtained by analyzing product images showing the "n" second products are calculated and a similarity between the calculated first statistic amount and the calculated and second statistic amount is set as the preference suitability in the step of calculating the preference suitability.

According to the invention, since the preference suitability between the preference of the user and the preference of the store is calculated based on a product (first product) relevant to the purchase action history information of one user and a product (second product) handled by the store, a store having a higher preference suitability calculated can be set as a store handling a larger number of user's favorite products. Therefore, users can search for stores matching their preferences.

BRIEF DESCRIPTION OF THE DRAWINGS

FIG. 3 is a chart showing an example of the configuration of a user DB.

FIG. 4 is a chart showing an example of the configuration of a store DB.

FIG. 5 is a chart showing an example of the configuration of a product DB.

DESCRIPTION OF THE PREFERRED EMBODIMENTS

Hereinafter, embodiments of a search apparatus, a search system, and a search method according to the invention will be described with reference to the accompanying diagrams.

[Search System 1]

Figure 1:
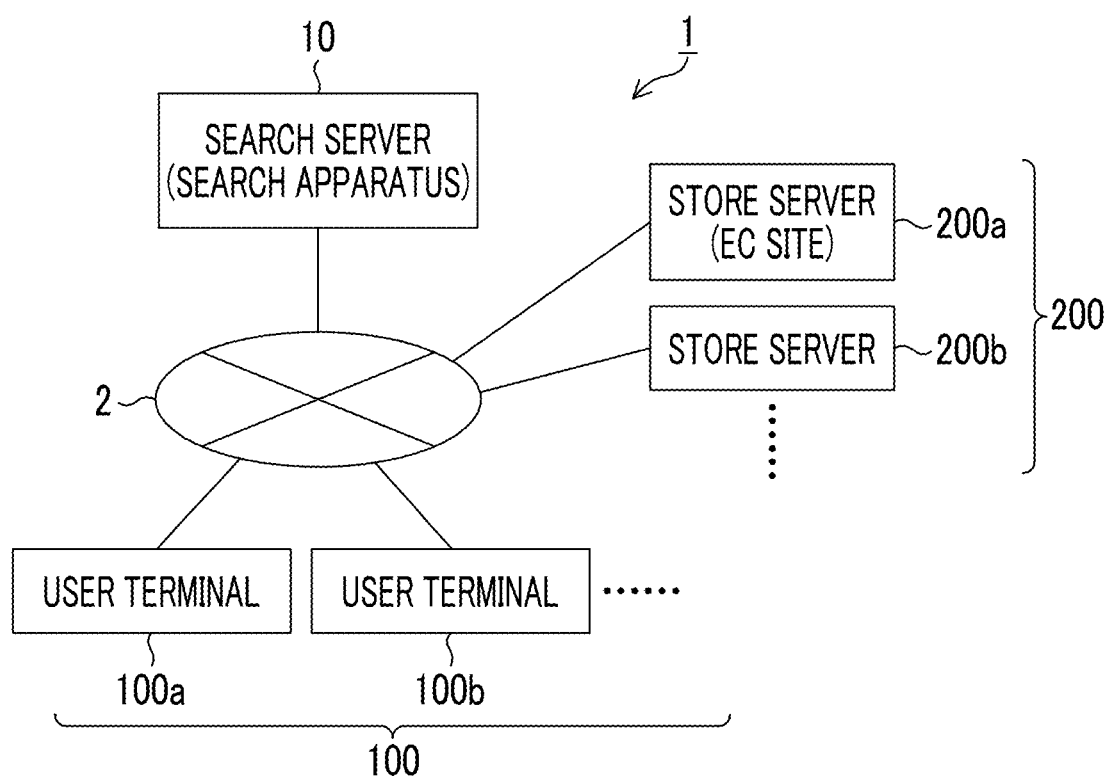
FIG. 1 is a conceptual diagram of a search system according to the invention.

FIG. 1 is a conceptual diagram of the search system 1 according to the invention. The search system 1 according to the present embodiment is configured to include a search server 10 functioning as a search apparatus, a user terminal 100 (100a, 100b, . . . ) for each user, and a server (hereinafter, referred to as a "store server") 200 (200a, 200b, . . . ) of an electronic commerce (EC) site. The search server 10, the user terminal 100, and the store server 200 are connected to each other through a network (Internet) 2.

The EC site is a site that displays information of products including images of products in a virtual store on the network 2 and performs electronic commerce, such as sale of products. In the store of the present embodiment, "furnishings, especially clothes" are handled as products. However, products are not limited to these, and it is possible to handle any other products.

The user terminal 100 is a terminal that is operated in the case of searching for stores (including virtual stores on the network 2 and real stores) or searching for products such as clothes handled by the stores.

The search server 10 searches for stores according to a command transmitted from the user terminal 100, and returns the search result to the user terminal 100.

Search Server of the First Embodiment

In the search system 1, the functional configuration of the search server 10 will be described first.

Figure 2:
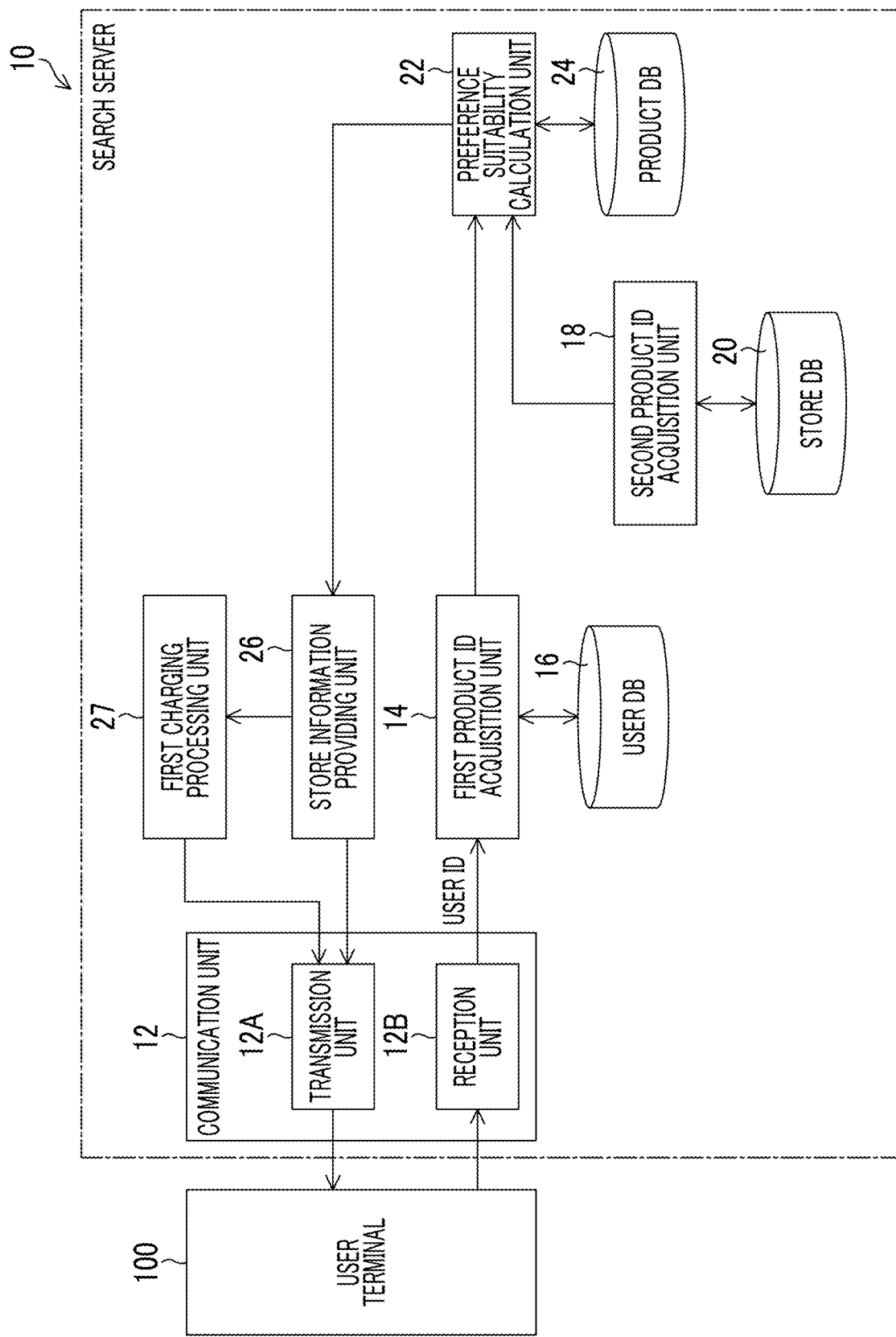
FIG. 2 is a block diagram showing an example of the functional configuration of a search server of a first embodiment.

FIG. 2 is a block diagram showing an example of the functional configuration of the search server 10 of the first embodiment.

The search server 10 of the first embodiment is a portion that functions as the search apparatus according to the invention. The search server 10 of the first embodiment is configured to mainly include a communication unit 12 (a transmission unit 12A and a reception unit 12B), a first product identification information acquisition unit (first product identification (ID) acquisition unit) 14, a user database (DB) 16, a second product identification information acquisition unit (second product ID acquisition unit) 18, a store database (store DB) 20, a preference suitability calculation unit 22, a product database (product DB) 24, a store information providing unit 26, and a first charging processing unit 27.

The reception unit (second reception unit) 12B functioning as a user identification information receiving unit receives user identification information (user ID) for uniquely specifying a user who is the owner of the user terminal 100, which is transmitted from the user terminal 100 through the network 2, and a search request for making a request for a search of a store handling a large number of user's (his or her) favorite products, and outputs the user ID to the first product ID acquisition unit 14.

The first product ID acquisition unit 14 acquires first product identification information (first product ID), which is registered so as to be associated with the user ID, from the user DB 16 based on the input user ID.

FIG. 3 is a chart showing an example of the configuration of the user DB 16.

As shown in FIG. 3, in the user DB 16, a first product ID is registered so as to be associated with the user ID of each user.

The first product ID registered in the user DB 16 is a product ID indicating a product (first product) relevant to the purchase action history information of the user. Here, the purchase action history information of the user includes one or more pieces of history information among history information obtained as a result of selecting a product and putting the selected product in the online shopping cart, for example, at the EC site, history information obtained as a result of selecting a product and registering the selected product in the favorites list, history information obtained as a result of selecting a product and browsing the detailed display of the selected product, and history information obtained as a result of selecting a product and registering the selected product in my closet.

The search server 10 acquires the purchase action history information (log) of the user together with the user ID from the user terminal 100 of each user, and builds the user DB 16 shown in FIG. 3 based on the purchase action history information of the user.

The user DB 16 of this example classifies and registers the product ID according to the type of the purchase action history information of the user (history information of products registered as favorites, history information of products displayed in detail, history information of products put in the cart, and history information of products registered in my closet).

The search server 10 receives global positioning system (GPS) information from the user terminal 100, and registers action range information (for example, a commuting or school route, or a shopping range) of a normal user in the user DB 16 based on the received GPS information. In addition, personal information, such as the user's name, age, sex, address, and telephone number, is also registered in the user DB 16. However, these are omitted in FIG. 3.

Returning to FIG. 2, the first product ID acquisition unit 14 acquires the first product ID (in this example, all the first product IDs), which is registered corresponding to the user ID, from the user DB 16 based on the input user ID, and outputs the acquired first product ID to the preference suitability calculation unit 22.

On the other hand, the second product ID acquisition unit 18 acquires second product identification information (second product ID), which is registered so as to be associated with the store identification information (store ID) of each store, from the store DB 20.

FIG. 4 is a chart showing an example of the configuration of the store DB 20.

As shown in FIG. 4, in the store DB 20, a second product ID indicating a product (second product) handled by each store is registered so as to be associated with the store ID of each store. In addition, information, such as a store name, the address of a real store, a telephone number, the brand of a product being handled, and the price range of a product, is registered in the store DB 20.

The second product ID acquisition unit 18 acquires the second product ID (in this example, product IDs of all products handled by one store), which is registered for each store so as to be associated with the store ID, from the store DB 20 and outputs the acquired second product ID to the preference suitability calculation unit 22.

The preference suitability calculation unit 22 calculates the preference suitability between the user's preference and the preference of a store for each store based on a first product corresponding to the first product ID input from the first product ID acquisition unit 14 and a second product corresponding to the second product ID input from the second product ID acquisition unit 18. In particular, the preference suitability calculation unit 22 calculates a similarity between the first design feature amount obtained by analyzing a product image showing the first product and a second design feature amount obtained by analyzing a product image showing the second product, and calculates the preference suitability between the user's preference and the preference of the store based on the calculated similarity.

In addition, the preference suitability calculation unit 22 acquires the first design feature amount obtained by analyzing the product image showing the first product and the second design feature amount obtained by analyzing the product image showing the second product, from the product DB 24, based on the first product ID and the second product ID.

FIG. 5 is a chart showing an example of the configuration of the product DB 24.

Figure 13:
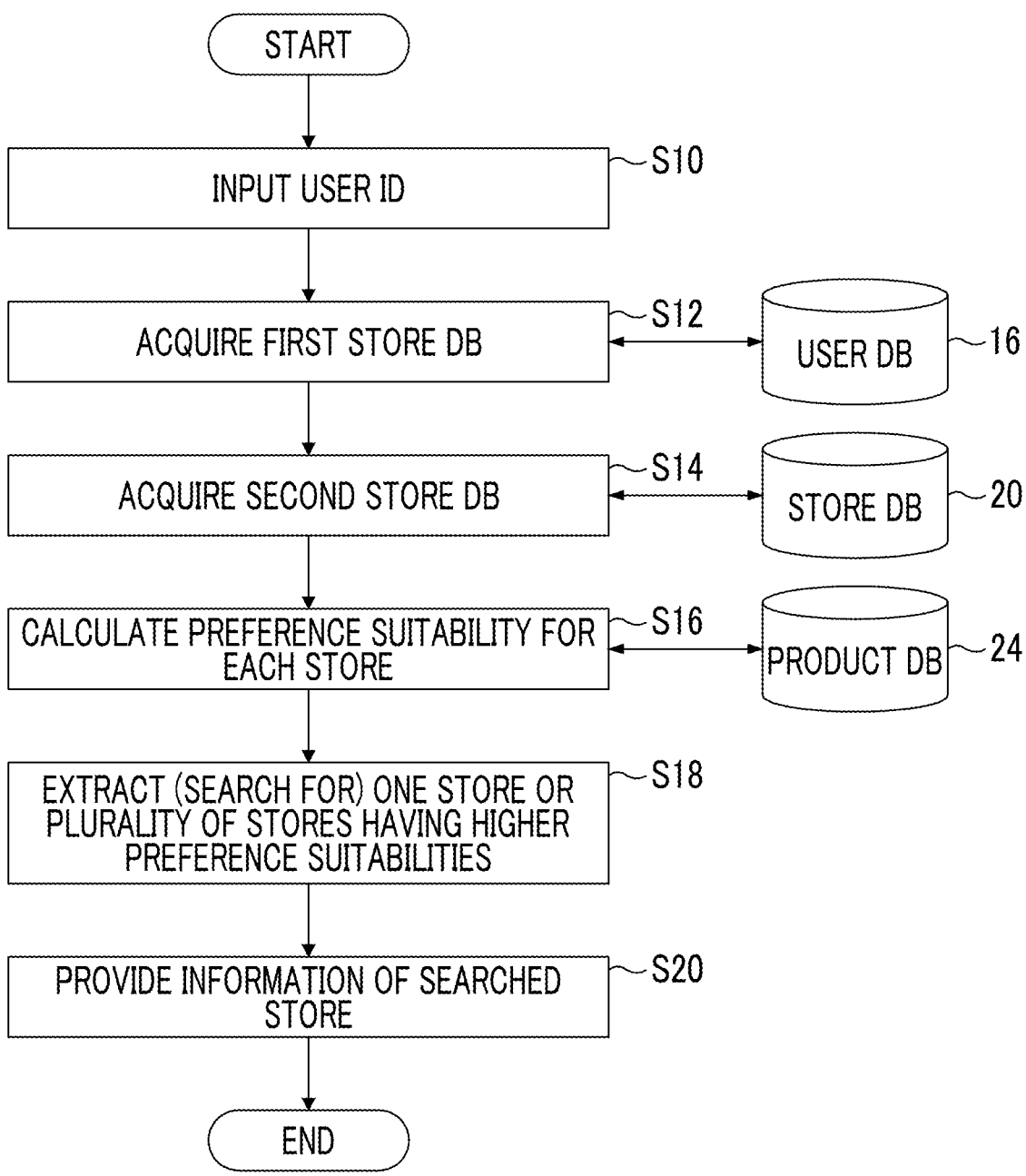
FIG. 13 is a flowchart showing an embodiment of a search method according to the invention.

As shown in FIG. 13, in the product DB 24, category information of a product, a product image, a design feature amount (color, pattern, shape, or texture) obtained by analyzing an image of a product, a sensibility feature amount for specifying the impression of a product (a first product or a second product), a store ID (EC site) handling products, product brand, stock, size, price, and other pieces of information are registered so as to be associated with each product (product ID). Here, the category information indicates the category of a product (clothes), and is information, such as blouse, skirt, pants, T-shirt, and one piece. This is used in the case of narrowing down the category of a product to be searched for by the user terminal 100.

Next, the design feature amount obtained by analyzing an image of a product will be described.

The design feature amount obtained by analyzing an image of a product is a physical measurement value, such as a color feature amount, a pattern feature amount, a shape feature amount, and a texture feature amount.

The sensibility feature amount for specifying the impression of a product, which can be calculated based on the design feature amount, can also be one of the design feature amounts. Here, the sensibility feature amount is sensibility space coordinates on the sensibility space expressed in a two-dimensional manner.

First, the color feature amount that is one of the design feature amounts of products will be described.

The color feature amount is information indicating a representative color of an image of each smoothed region obtained by cutting out a region including a color representing an image of a product and smoothing an image of each region with a smoothing filter.

In this example, values (hereinafter, referred to as "HSV values") of three attributes (hue (H), saturation (S), and value (V)) in the HSV color space are acquired as the color feature amount. In a case where the representative color of a product is two or more colors, the color feature amount (HSV value) for each of two or more representative colors is acquired.

For each acquired color feature amount (HSV value), corresponding color information is selected from the basic color palette having 130 colors. Here, 130 colors have 120 chromatic colors and 10 achromatic colors. The 120 chromatic colors are combinations of 10 kinds of hues and 12 kinds of tones, and the 10 achromatic colors are 10 kinds of tones ranging from white to black.

In a case where one color feature amount (HSV value) is measured, it is possible to determine one color (color information) corresponding to the measured color feature amount among 130 colors (#1 to #130) in the basic color palette.

In a case where the representative color of an image of a product is two colors, it is possible to specify two colors (two color arrangement) on the basic color palette. Similarly, in a case where the representative color of an image of a product is three colors, it is possible to specify three colors (three color arrangement) on the basic color palette.

As the pattern feature amount, for example, a feature amount defined by a pattern density and a pattern size can be considered. As the shape feature amount, for example, a feature amount defined by the entire width (thin-thick), the sleeve size (short-long), the length (short-long), and the width and height of the neckline, the sectional area (small-large) of the space that is defined by the neckline and is for making the user's head pass therethrough, the angle of the V neck (small-large), the curvature of the U neck (small-large), and the like can be considered. As the texture feature amount, for example, a feature amount defined by glossiness and transparency can be considered.

Next, the sensibility feature amount for specifying the impression of a product will be described.

Figure 6:
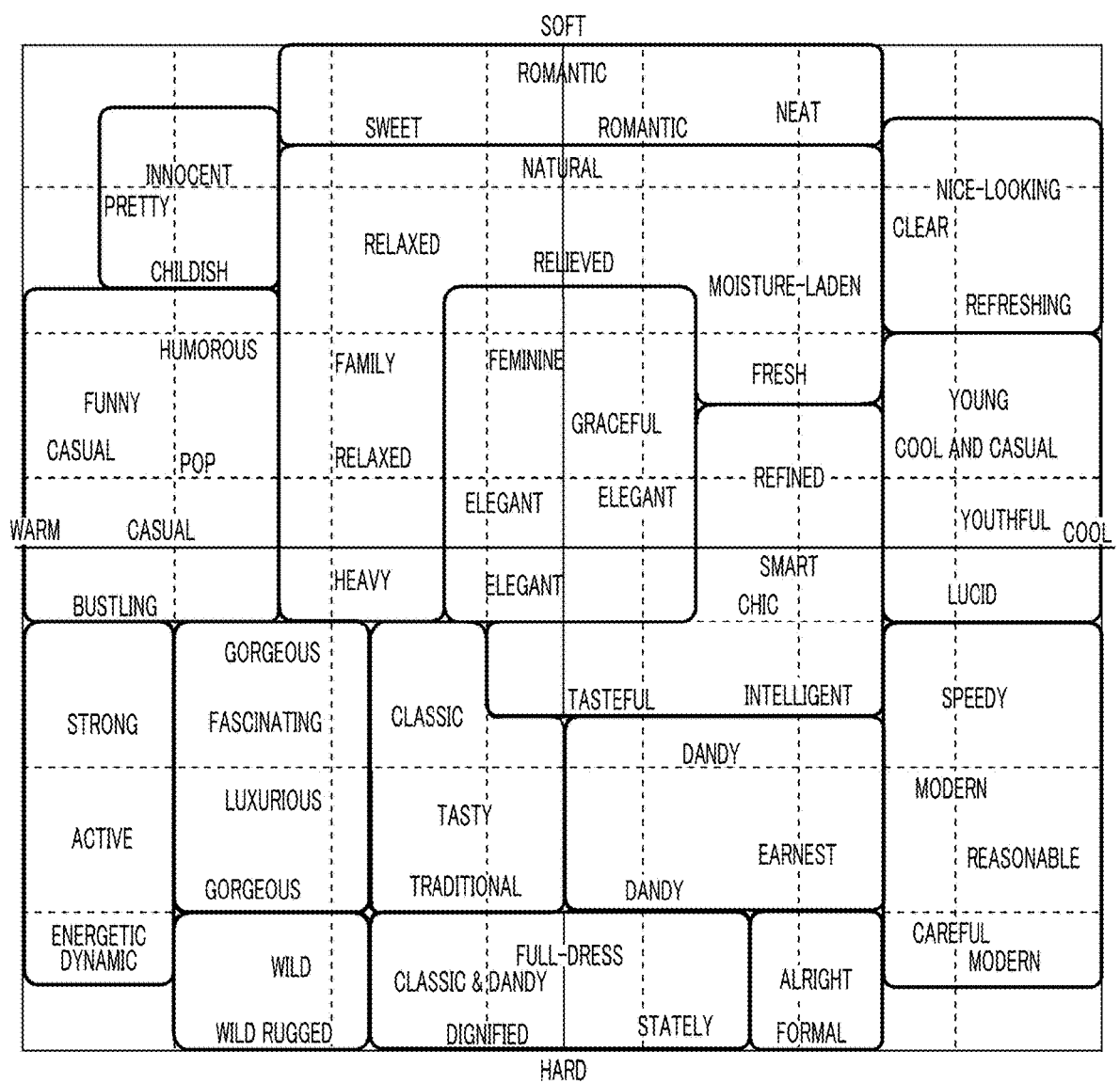
FIG. 6 is a diagram showing a language image scale showing sensibility words arranged in the sensibility space.
Figure 7:
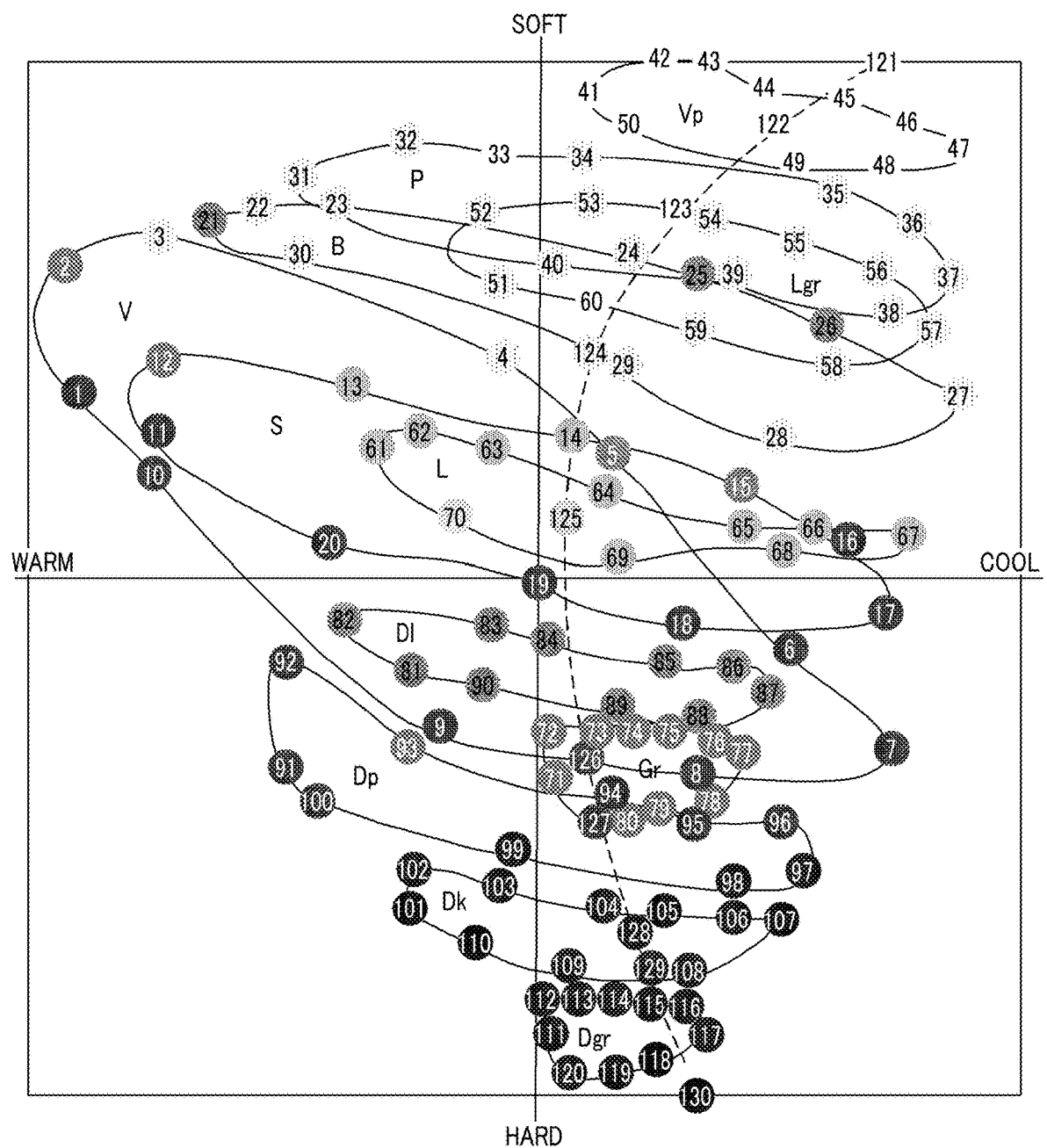
FIG. 7 is a diagram showing a single color image scale of single colors (130 colors) arranged in the sensibility space.
Figure 8:
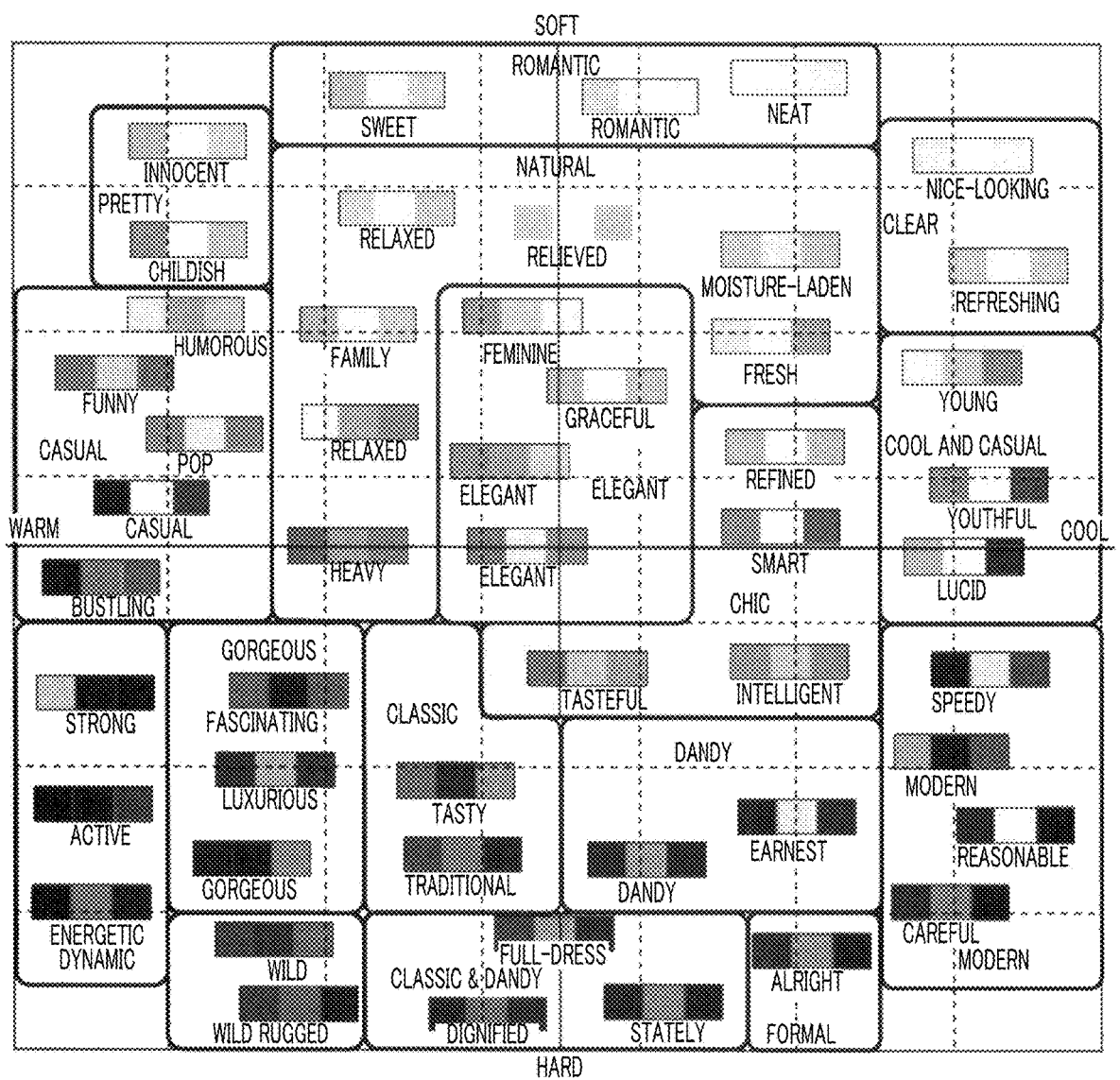
FIG. 8 is a diagram showing an image scale of three color arrangement that is arranged in the sensibility space.

FIG. 6 is a language image scale showing sensibility words arranged in the sensibility space, and FIG. 7 is a single color image scale of single colors (130 colors of the basic color palette) arranged in the sensibility space. FIG. 8 is an image scale of three color arrangement that is arranged in the sensibility space. The image scales shown in FIGS. 6, 7, and 8 are image scales disclosed by Nippon Color Design Laboratory Co., Ltd. (Shoichi Kobayashi's "Color System" (Kodansha) and http://www.ncd-ri.co.jp/about/image_system.html).

The sensibility space shown in FIGS. 6 to 8 is a space defined by the horizontal axis indicating the degree of WARM/COOL and the vertical axis indicating the degree of HARD/SOFT.

In the language image scale shown in FIG. 6, 64 sensibility words are arranged in the above-described sensibility space. In the single color image scale shown in FIG. 7, 130 single colors are arranged in the sensibility space. The symbols shown in FIG. 7 indicate positions of 12 kinds of tones of vivid (V), strong (S), bright (B), pale (P), very pale (Vp), light grayish (Lgr), light (L), grayish (Gr), dull (Dl), deep (Dp), dark (Dk), and dark grayish (Dgr). As representative ones among the 130 colors indicated by numbers, 1 to 10 indicate representative hue positions. 1 is red, 2 is orange, 3 is yellow, 4 is yellow green, 5 is green, 6 is blue green, 7 is blue, 8 is blue purple, 9 is purple, and 10 is red purple. 121 is white, and 130 is black.

The image scale of the three color arrangement shown in FIG. 8 shows one three color arrangement corresponding to 64 sensibility words. However, there are a plurality of three color arrangements corresponding to one sensibility word.

As shown in FIGS. 6 to 8, it can be seen that there is a correlation between the sensibility word and the color feature amount (single color, three color arrangement). Without being limited to the three color arrangement shown in FIG. 8, even in cases of the two color arrangement and the N color arrangement, there is a correlation between the sensibility word and the color feature amount.

Therefore, by preparing a conversion table or a conversion expression showing the relationship between the color feature amount (single color, color arrangement (two colors, three colors, or N colors)) and the sensibility word in advance and acquiring color information of single color and color arrangement, it is possible to convert the color information into a sensibility word by using the conversion table or the like. Then, the sensibility feature amount in this example is sensibility space coordinates on the sensibility space where sensibility words are arranged. In a case where the representative color is a single color, the sensibility feature amount is sensibility space coordinates on the sensibility space where the single color is arranged.

Returning to FIG. 2, the preference suitability calculation unit 22 acquires, from the product DB 24, the first design feature amount of the first product corresponding to the first product ID input from the first product ID acquisition unit 14 and the second design feature amount of the second product corresponding to the second product ID input from the second product ID acquisition unit 18, calculates a similarity between the acquired first design feature amount and second design feature amount, and calculates the preference suitability between the user's preference and the preference of the store based on the calculated similarity.

As a method of calculating the preference suitability, there are the following round robin method and statistic amount comparison method.

<Round Robin Method>

Figure 9:
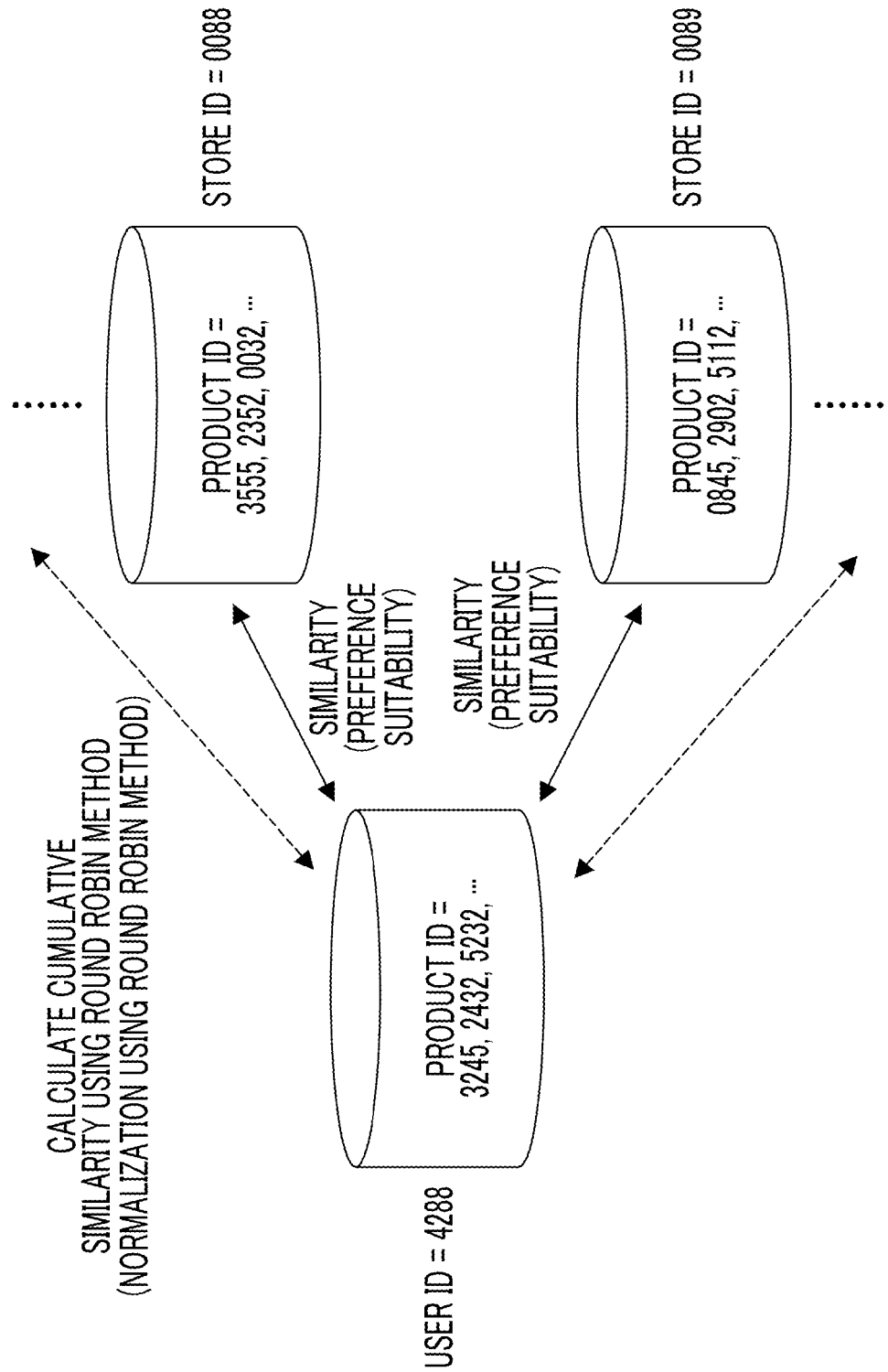
FIG. 9 is a diagram conceptually showing a method of calculating the preference suitability using a round robin method.

FIG. 9 is a diagram conceptually showing a method of calculating the preference suitability using a round robin method.

As shown in FIG. 9, first product IDs (=3245, 2432, 5232, . . . ) of a plurality of first products can be acquired from the user DB 16 based on the user ID (=4288), and the first design feature amount for each of the plurality of first products (first product IDs) can be acquired from the product DB 24 based on the plurality of acquired first product IDs.

Here, assuming that the number of first products is m (m: an integer of 2 or more), it is possible to acquire "m" first design feature amounts.

On the other hand, based on the store ID of one store (for example, a store having a store ID (=0088)) among a plurality of stores, second product IDs (=3555, 2352, 0032, . . . ) of a plurality of second products handled by the store can be acquired from the store DB 20. Based on the plurality of acquired second product IDs, the second design feature amount for each of the plurality of second products (second product IDs) can be acquired from the product DB 24.

Here, assuming that the number of second products is n (n: an integer of 2 or more), it is possible to acquire "n" second design feature amounts.

The preference suitability calculation unit 22 calculates "m×n" similarities between "m" first design feature amounts and "n" second design feature amounts, and sets the average value of the calculated "m×n" similarities as the preference suitability.

Assuming that the first and second design feature amounts are color feature amounts of one representative color of the first and second products, the similarity between the first and second design feature amounts (that is, first and second products) can be calculated based on a calculated distance in the color space (for example, HSV color space) between the first color feature amount and the second color feature amount. In this case, the similarity increases as the distance decreases, and the similarity decreases as the distance increases.

The similarity can be calculated using the pattern feature amount, the shape feature amount, the texture feature amount, or the sensibility feature amount as the design feature amount instead of the color feature amount. In addition, the similarity can be calculated by combining two or more feature amounts of these feature amounts. In the case of calculating the similarity by combining two or more feature amounts, it is preferable to calculate the total similarity by performing weighting according to the type of the feature amount.

The preference suitability calculation unit 22 can calculate the preference suitability between one user (user ID=4288) and one store (store ID=0088) from the calculated similarity. In addition, the preference suitability calculation unit 22 similarly calculates the preference suitability between one user (user ID=4288) and all other stores. That is, the preference suitability calculation unit 22 calculates the preference suitability for all the stores. As a result, a store handling a large number of favorite products of one user can be determined based on the calculated preference suitability.

<Statistic Amount Comparison Method>

Figure 10:
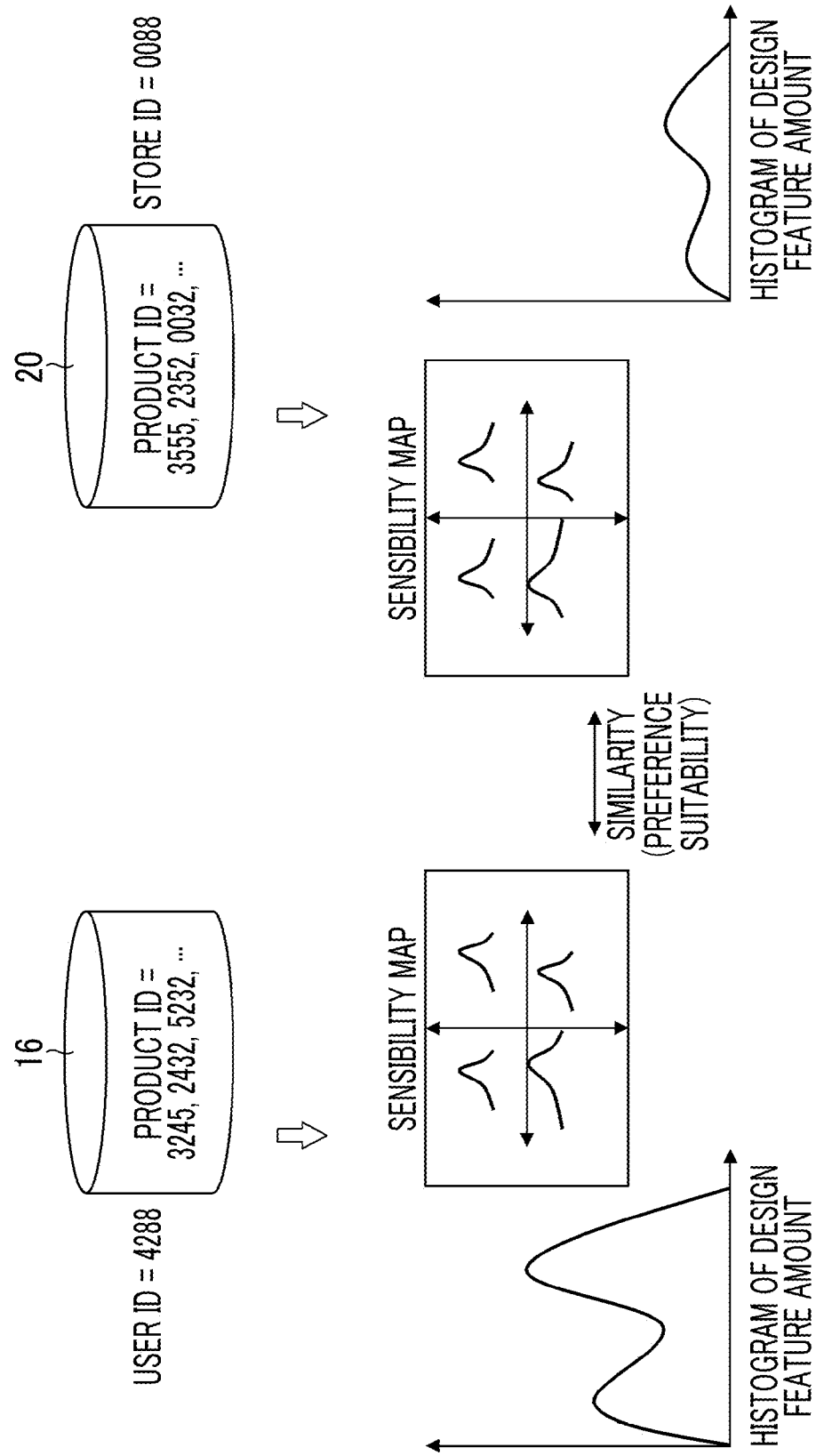
FIG. 10 is a diagram conceptually showing a method of calculating the preference suitability using a statistic amount comparison method.

FIG. 10 is a diagram conceptually showing a method of calculating the preference suitability using a statistic amount comparison method.

As shown in FIG. 10, first product IDs (=3245, 2432, 5232, . . . ) of a plurality of first products can be acquired from the user DB 16 by the user ID (=4288), and the first design feature amount for each of the plurality of first products (first product IDs) can be acquired from the product DB 24 by the plurality of acquired first product IDs.

Here, assuming that the number of first products is m (m: an integer of 2 or more), it is possible to acquire "m" first design feature amounts.

The preference suitability calculation unit 22 creates a first histogram (first statistic amount) of the acquired "m" first design feature amounts.

On the other hand, based on the store ID of one store (for example, a store having a store ID (=0088)) among a plurality of stores, second product IDs (=3555, 2352, 0032, . . . ) of a plurality of second products handled by the store can be acquired from the store DB 20. Based on the plurality of acquired second product IDs, the second design feature amount for each of the plurality of second products (second product IDs) can be acquired from the product DB 24.

Here, assuming that the number of second products is n (n: an integer of 2 or more), it is possible to acquire "n" second design feature amounts.

The preference suitability calculation unit 22 creates a second histogram (second statistic amount) of the acquired "n" second design feature amounts.

Then, the preference suitability calculation unit 22 calculates the similarity between the created first histogram of the first design feature amount and the created second histogram of the second design feature amount.

The similarity (correlation) between the first and second histograms can be calculated by using the Bhattacharyya distance, for example. In the case of calculating the similarity between the first and second histograms, normalization is performed so that the sum of the frequencies in the first and second histograms becomes 1.

Assuming that the first and second design feature amounts are color feature amounts of one representative color of the first and second products, In the HSV color specification system, three histograms of hue (H), saturation (S), and value (V) in the HSV color coordinate system are generated. Therefore, assuming that the Bhattacharyya distance between the first and second histograms are $S_H$, $S_S$, and $S_V$, the overall similarity S can be calculated by the following equation, $$S=\sqrt{(S_H^2+S_S^2+S_V^2)}.$$

The preference suitability calculation unit 22 calculates the preference suitability between one user (user ID=4288) and one store (store ID=0088) by calculating the similarity between the first histogram of the first design feature amount and the second histogram of the second design feature amount. In addition, the preference suitability calculation unit 22 similarly calculates the preference suitability between one user (user ID=4288) and all other stores.

Instead of creating the histogram of the design feature amount, the preference suitability calculation unit 22 may create a first sensibility map (first statistic amount) by mapping the first design feature amount (sensibility space coordinates or representative color (refer to FIG. 7)) in the two-dimensional sensibility space shown in FIGS. 6 to 8 and a second sensibility map (second statistic amount) by mapping the second design feature amount to the sensibility space coordinates, and calculate a normalized correlation between the first sensibility map and the second sensibility map. Then, the preference suitability calculation unit 22 calculates the preference suitability between one user (user ID=4288) and one store (store ID=0088) by calculating the normalized correlation (similarity). In addition, the preference suitability calculation unit 22 similarly calculates the preference suitability between one user (user ID=4288) and all other stores.

Returning to FIG. 2, after calculating the preference suitability between a user who has made a request for the introduction of stores and all the stores, the preference suitability calculation unit 22 outputs the preference suitability of each store to the store information providing unit 26.

The store information providing unit 26 extracts (searches for) one store having the highest preference suitability based on the preference suitability of each store input from the preference suitability calculation unit 22 or sorts stores in descending order of preference suitability and extracts (searches for) two or more stores having higher preference suitabilities, and transmits the information of the searched one store or two or more stores to the user terminal 100 through the transmission unit 12A. The information of a store to be transmitted is, for example, information of a store name, uniform resource locator (URL) of the EC site of a store, and the location of a real store.

In a case where store information is provided to the user from the store information providing unit 26, the first charging processing unit 27 charges a fee to the store to which the store information has been provided. For example, the first charging processing unit 27 counts the number of times of providing the store information in a predetermined period (one week or one month) for each store, and charges a fee to the store according to the counting result. This charging is a fee for introducing the store to the user. The charging information may be transmitted to the store server 200, or may be separately transmitted to the store.

According to the search system 1, the user can search for stores handling a large number of his or her favorite products through the search server 10 by operating the user terminal 100.

<User Terminal 100>

The user terminal 100 is a terminal that is operated in the case of searching for a store or searching for a product handled by a store. For example, the user terminal 100 may take a form of a portable terminal, such as a smartphone or a tablet device, and a personal computer.

Hereinafter, a smartphone that can function as the user terminal 100 will be described.

Figure 11:
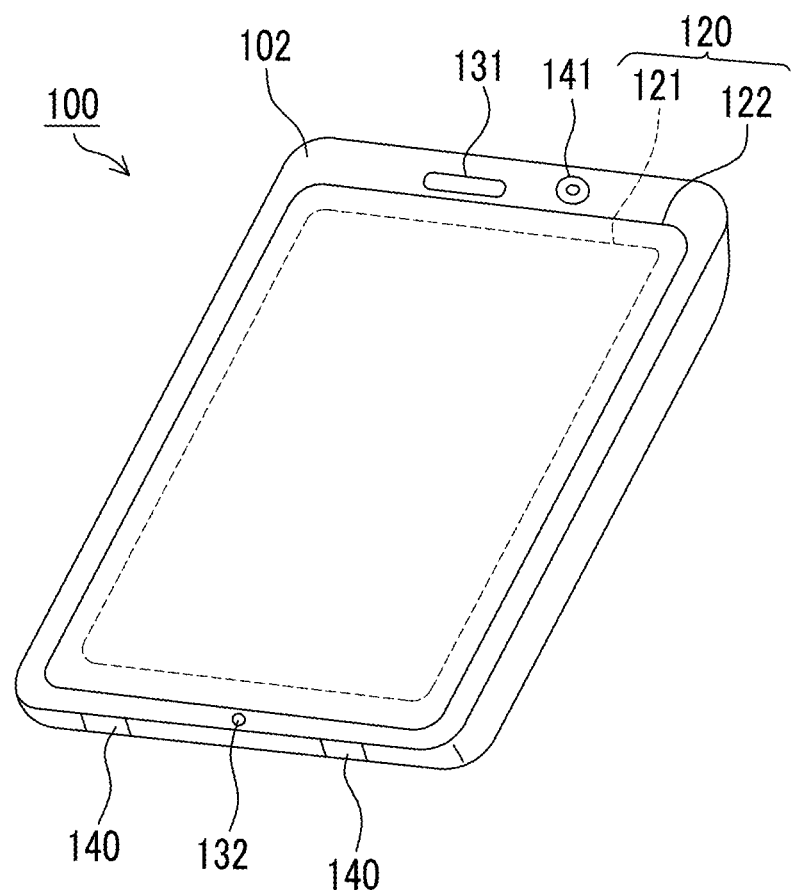
FIG. 11 is a diagram showing the appearance of a smartphone that is an embodiment of a user terminal.

FIG. 11 is a diagram showing the appearance of a smartphone that is an embodiment of the user terminal 100. The user terminal (hereinafter, referred to as a "smartphone") 100 shown in FIG. 11 has a plate-shaped housing 102. On one surface of the housing 102, a display input unit 120 is provided in which a display panel 121 as a display unit and an operation panel 122 as an input unit are integrally formed. The housing 102 includes a speaker 131, a microphone 132, an operation unit 140, and a camera unit 141. The configuration of the housing 102 is not limited to this. For example, it is possible to adopt a configuration in which a display unit and an input unit are separately provided, or it is possible to adopt a configuration having a folded structure or a sliding mechanism.

Figure 12:
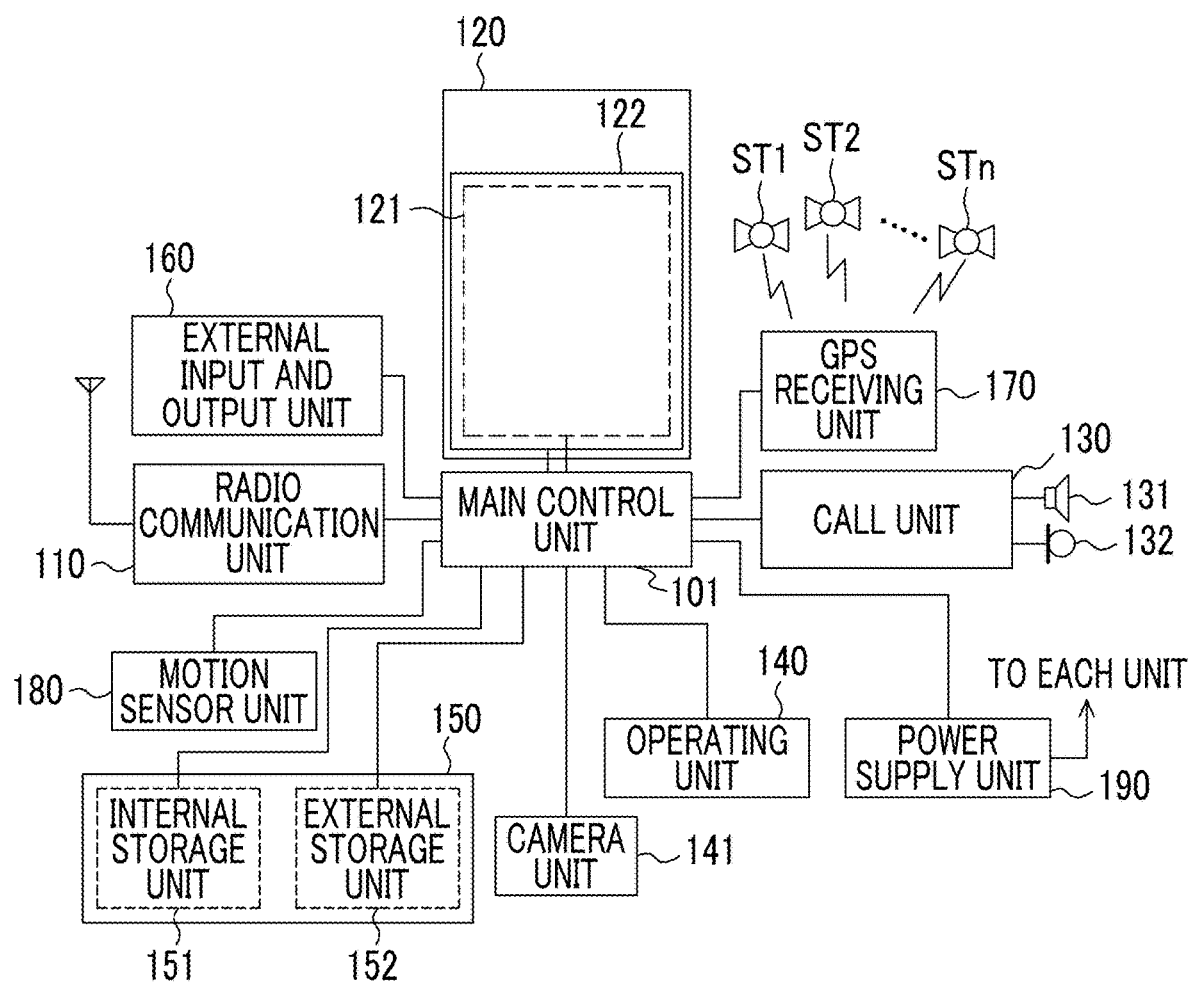
FIG. 12 is a block diagram showing the internal configuration of a smartphone.

FIG. 12 is a block diagram showing the internal configuration of the smartphone 100 shown in FIG. 11. As shown in FIG. 12, a radio communication unit 110, the display input unit 120, a call unit 130, the operation unit 140, the camera unit 141, a storage unit 150, an external input and output unit 160, a global positioning system (GPS) receiving unit 170, a motion sensor unit 180, a power supply unit 190, and a main control unit 101 are provided as main components of the smartphone 100. As a main function, the smartphone 100 has a radio communication function for performing mobile radio communication through a base station apparatus and a mobile communication network.

The radio communication unit 110 performs radio communication with a base station apparatus connected to the mobile communication network according to the instruction of the main control unit 101. The radio communication is used to transmit and receive various kinds of file data such as audio data and image data, electronic mail data, and the like and to receive Web data, streaming data, and the like.

The display input unit 120 is a so-called touch panel including the display panel 121 and the operation panel 122. The display input unit 120 displays images (still images and motion pictures), character information, and the like in order to visually transmit the information to the user and detects a user operation on the displayed information under the control of the main control unit 101.

In the display panel 121, a liquid crystal display (LCD), an organic electro-luminescence display (OELD), or the like is used as a display device. The operation panel 122 is a device that is provided in a state in which an image displayed on the display surface of the display panel 121 is visible and that detects one or more coordinates operated by the user's finger or a stylus. In a case where the device is operated by the user's finger or a stylus, the operation panel 122 outputs a detection signal generated due to the operation to the main control unit 101. Then, the main control unit 101 detects an operation position (coordinates) on the display panel 121 based on the received detection signal.

The display panel 121 and the operation panel 122 of the smartphone 100 illustrated in FIG. 11 are integrated to form the display input unit 120. However, the operation panel 122 is disposed so as to completely cover the display panel 121. In a case in which such an arrangement is adopted, the operation panel 122 may have a function of detecting a user operation even in a region outside the display panel 121. In other words, the operation panel 122 may include a detection region of an overlapping portion that overlaps the display panel 121 (hereinafter, referred to as a display region) and a detection region of the other outer edge portion that does not overlap the display panel 121 (hereinafter, referred to as a non-display region).

Although the size of the display region and the size of the display panel 121 may be completely the same, the size of the display region and the size of the display panel 121 may not necessarily be the same. The operation panel 122 may include two sensitive regions of an outer edge portion and the other inner portion. The width of the outer edge portion may be appropriately designed according to the size of the housing 102 or the like. In addition, as a position detection method adopted in the operation panel 122, a matrix switch method, a resistance film method, a surface acoustic wave method, an infrared method, an electromagnetic induction method, an electrostatic capacitance method, and the like can be mentioned, and any of the methods may be adopted.

The call unit 130 includes the speaker 131 and the microphone 132. The call unit 130 converts the voice of the user, which is input through the microphone 132, into audio data that can be processed by the main control unit 101, and outputs the audio data to the main control unit 101. Alternatively, the call unit 130 decodes audio data received by the radio communication unit 110 or the external input and output unit 160, and outputs the audio data from the speaker 131. For example, as shown in FIG. 11, the speaker 131 and the microphone 132 can be mounted on the same surface as a surface on which the display input unit 120 is provided.

The operation unit 140 is a hardware key using a key switch or the like, and receives an instruction from the user. For example, as shown in FIG. 11, the operation unit 140 is a push button type switch that is mounted on the side surface of the housing 102 of the smartphone 100 and that is turned on in the case of being pressed with a finger or the like and is turned off by the restoring force of the spring or the like in a case where the finger is released.

The storage unit 150 stores a control program or control data of the main control unit 101, application software, address data in which the name, telephone number, and the like of the communication partner are associated with each other, transmitted or received e-mail data, Web data downloaded by Web browsing, downloaded content data, and the like, and temporarily stores streaming data and the like. In addition, the storage unit 150 is formed by an internal storage unit 151 built into the smartphone and an external storage unit 152 having a detachable external memory slot. Each of the internal storage unit 151 and the external storage unit 152 that form the storage unit 150 is realized by using storage media, such as a flash memory type memory, a hard disk type memory, a multimedia card micro type memory, a card type memory, a random access memory (RAM), a read only memory (ROM), and the like.

The external input and output unit 160 plays a role of an interface with all external apparatuses connected to the smartphone 100, and is directly or indirectly connected to other external apparatuses through communication (for example, a universal serial bus (USB) or IEEE 1394) or a network (for example, the Internet, wireless local area network (LAN), Bluetooth (registered trademark), radio frequency identification (RFID), infrared data association (IrDA), Ultra Wideband (UWB; registered trademark), or ZigBee (registered trademark)).

Examples of the external apparatus connected to the smartphone 100 include a wired/wireless headset, wired/wireless external charger, wired/wireless data port, a memory card or a subscriber identity module card (SIM)/user identity module card (UIM) card connected through a card socket, an external audio/video apparatus connected through an audio/video input/output (I/O) terminal, and an external audio/video apparatus, a smartphone, a personal computer, and a personal digital assistant (PDA) that are connected in a wired/wireless manner, and an earphone. Through the external input and output unit 160, data received from such an external apparatus may be transmitted to each component inside the smartphone 100, or data in the smartphone 100 may be transmitted to the external apparatus.

According to the instruction of the main control unit 101, the GPS receiving unit 170 receives GPS signals transmitted from GPS satellites ST1, ST2, STn, performs positioning calculation processing based on the plurality of received GPS signals, and acquires location information (GPS information) specified by the latitude, longitude, and altitude of the smartphone 100. In a case in which location information can be acquired from the radio communication unit 110 and/or the external input and output unit 160 (for example, a wireless LAN), the GPS receiving unit 170 can detect the location using the location information.

The motion sensor unit 180 includes, for example, a three-axis acceleration sensor, and detects the physical movement of the smartphone 100 according to the instruction of the main control unit 101. By detecting the physical movement of the smartphone 100, the movement direction or acceleration of the smartphone 100 is detected. The result of the detection is output to the main control unit 101.

The power supply unit 190 supplies electric power stored in a battery (not shown) to each unit of the smartphone 100 according to the instruction of the main control unit 101.

The main control unit 101 includes a microprocessor, operates according to the control program or control data stored in the storage unit 150, and performs overall control of the respective units of the smartphone 100. In addition, in order to perform voice communication and data communication through the radio communication unit 110, the main control unit 101 has a mobile communication control function for controlling each unit of the communication system and an application processing function.

The application processing function is realized by the operation of the main control unit 101 according to the application software stored in the storage unit 150. Examples of the application processing function include an infrared communication function for performing data communication with other apparatuses by controlling the external input and output unit 160, an e-mail function for transmission and reception of an e-mail, a Web browsing function for browsing web pages, and the like.

The main control unit 101 has an image processing function of displaying a video on the display input unit 120 based on image data (data of a still image or a motion picture), such as received data or downloaded streaming data. The image processing function refers to a function in a case where the main control unit 101 decodes the above-described image data, performs image processing on the decoding result, and displays an image obtained by the image processing on the display input unit 120.

In addition, the main control unit 101 performs display control of the display panel 121 and operation detection control for detecting a user operation through the operation unit 140 or the operation panel 122.

By the execution of the display control, the main control unit 101 displays an icon for starting application software or a software key, such as a scroll bar, or displays a window for creating an e-mail. The scroll bar refers to a software key for receiving an instruction to move a display portion of, for example, a large image that cannot be fitted in the display region of the display panel 121.

In addition, by the execution of the operation detection control, the main control unit 101 detects a user operation through the operation unit 140, receives an operation on the above-described icon or an input of a character string to the input field of the above-described window through the operation panel 122, or receives a display image scroll request through the scroll bar.

In addition, by the execution of the operation detection control, the main control unit 101 has a touch panel control function for controlling the sensitive region of the operation panel 122 or the display position of the software key by determining whether the operation position of the operation panel 122 corresponds to an overlapping portion (display region) that overlaps the display panel 121 or corresponds to the other outer edge portion (non-display region) that does not overlap the display panel 121.

The main control unit 101 can also detect a gesture operation on the operation panel 122 and execute a function set in advance in response to the detected gesture operation. The gesture operation does not mean a conventional simple touch operation, but means an operation of drawing a trajectory with a finger or the like, an operation of designating a plurality of positions simultaneously, or an operation of drawing a trajectory for at least one of the plurality of positions by combining these.

The camera unit 141 can convert image data obtained by imaging into compressed image data, for example, joint photographic experts group (JPEG) image data, and can record the image data in the storage unit 150 or output the image data through the external input and output unit 160 or the radio communication unit 110, under the control of the main control unit 101. In the smartphone 100 shown in FIG. 11, the camera unit 141 is mounted on the same surface as the display input unit 120. However, the mounting position of the camera unit 141 is not limited thereto, and the camera unit 141 may be mounted on the back surface of the housing 102 instead of the front surface of the housing 102 on which the display input unit 120 is provided, or a plurality of camera units 141 may be mounted on the housing 102. In a case where a plurality of camera units 141 are mounted, the camera unit 141 provided for imaging may be switched to perform imaging with the single camera unit 141, or a plurality of camera units 141 may be simultaneously used to perform imaging.

The camera unit 141 can be used for various functions of the smartphone 100. For example, an image acquired by the camera unit 141 may be displayed on the display panel 121, or an image acquired by imaging of the camera unit 141 may be used as one of the operation input methods of the operation panel 122. In a case where the GPS receiving unit 170 detects a location, the location may be detected with reference to the image from the camera unit 141. In addition, by referring to the image from the camera unit 141, it is also possible to determine the direction of the optical axis of the camera unit 141 of the smartphone 100 or to determine the current use environment without using a three-axis acceleration sensor or in combination with the three-axis acceleration sensor. Needless to say, it is also possible to use the image from the camera unit 141 in the application software.

In addition, data obtained by adding location information acquired by the GPS receiving unit 170, audio information (may be text information obtained by performing audio/text conversion with the main control unit or the like) acquired by the microphone 132, posture information acquired by the motion sensor unit 180, or the like to image data of still image or the motion picture can be recorded in the storage unit 150 or can be output through the external input and output unit 160 or the radio communication unit 110.

The smartphone 100 having the above configuration can access the search server 10 through the radio communication unit 110. By transmitting the user ID and the password to the search server 10 through the radio communication unit 110, which functions as a first transmission unit, with an operation using the operation unit 140, it is possible to use the search server 10. In a case where the search server 10 can be used, the operation unit 140 functions as an operation unit that receives a search operation of a store suitable for the preference.

The smartphone 100 can access the EC site of each store that is opening in an online shopping mall (not shown) on the network 2 and select a desired product on the EC site and put the selected product in the online shopping cart, or select a product and register the selected product in the favorites list, or select a product and browse the detailed display of the selected product, or select a product and register the selected product in my closet.

The search server 10 and a server that manages an online shopping mall are integrated or cooperate with each other. The search server 10 acquires purchase action history information of the user at the EC site of each store that is opening in the online shopping mall (one or more pieces of history information among history information of products put in the online shopping cart, history information obtained as a result of selecting a product and registering the selected product in the favorites list, history information obtained as a result of selecting a product and browsing the detailed display of the selected product, and history information obtained as a result of selecting a product and registering the selected product in my closet), and creates and updates the user DB 16 shown in FIG. 3 based on the acquired purchase action history information.

In addition, the search server 10 acquires the information of a store from each store server 200, and creates and updates the store DB 20 shown in FIG. 4.

In a case where a store search request matching the user's preference is received from the smartphone 100, the search server 10 calculates the preference suitability between the user and each store as described above, and transmits information of a store having the highest preference suitability or information of two or more stores having higher preference suitabilities to the smartphone 100.

The smartphone 100 receives the store information transmitted from the search server 10 by using the radio communication unit 110 functioning as a first reception unit, and displays the received store information of the display panel 121 as a display unit.

As a result, the user can browse the store information displayed on the display panel 121 or can access the EC site of the store handling a large number of his or her favorite products based on the displayed store information.

[Search Method]

Next, a search method according to the invention will be described.

FIG. 13 is a flowchart showing an embodiment of the search method according to the invention. In particular, FIG. 13 shows a processing procedure in the search server 10.

In FIG. 13, in a case where the reception unit 12B of the search server 10 receives a user ID from the user terminal 100 (step S10), the first product ID acquisition unit 14 acquires a product ID managed corresponding to the user ID from the user DB 16 (FIG. 3) based on the input user ID (step S12).

On the other hand, the second product ID acquisition unit 18 acquires a second product ID, which is registered so as to be associated with the store ID of each store, from the store DB 20 (step S14).

The preference suitability calculation unit 22 calculates the preference suitability between the user's preference and the preference of the store for each store based on the first product ID acquired in step S12 and the second product ID acquired in step S14 (step S16). That is, the similarity between the first design feature amount obtained by analyzing the product image indicating the first product corresponding to the first product ID and the second design feature amount obtained by analyzing the product image indicating the second product corresponding to the second product ID is calculated, and the preference suitability between the user's preference and the preference of the store is calculated based on the calculated similarity.

Based on the preference suitability for each store calculated by the preference suitability calculation unit 22, the store information providing unit 26 extracts (searches for) one store having the highest preference suitability or extracts (searches for) two or more stores having higher preference suitabilities (step S18). Then, the information of the searched one store or two or more stores is transmitted (provided) to the user terminal 100 through the transmission unit 12A (step S20).

As a result, the user can search for stores handling a large number of his or her favorite products through the user terminal 100 and the search server 10.

Search Server of a Second Embodiment

Figure 14:
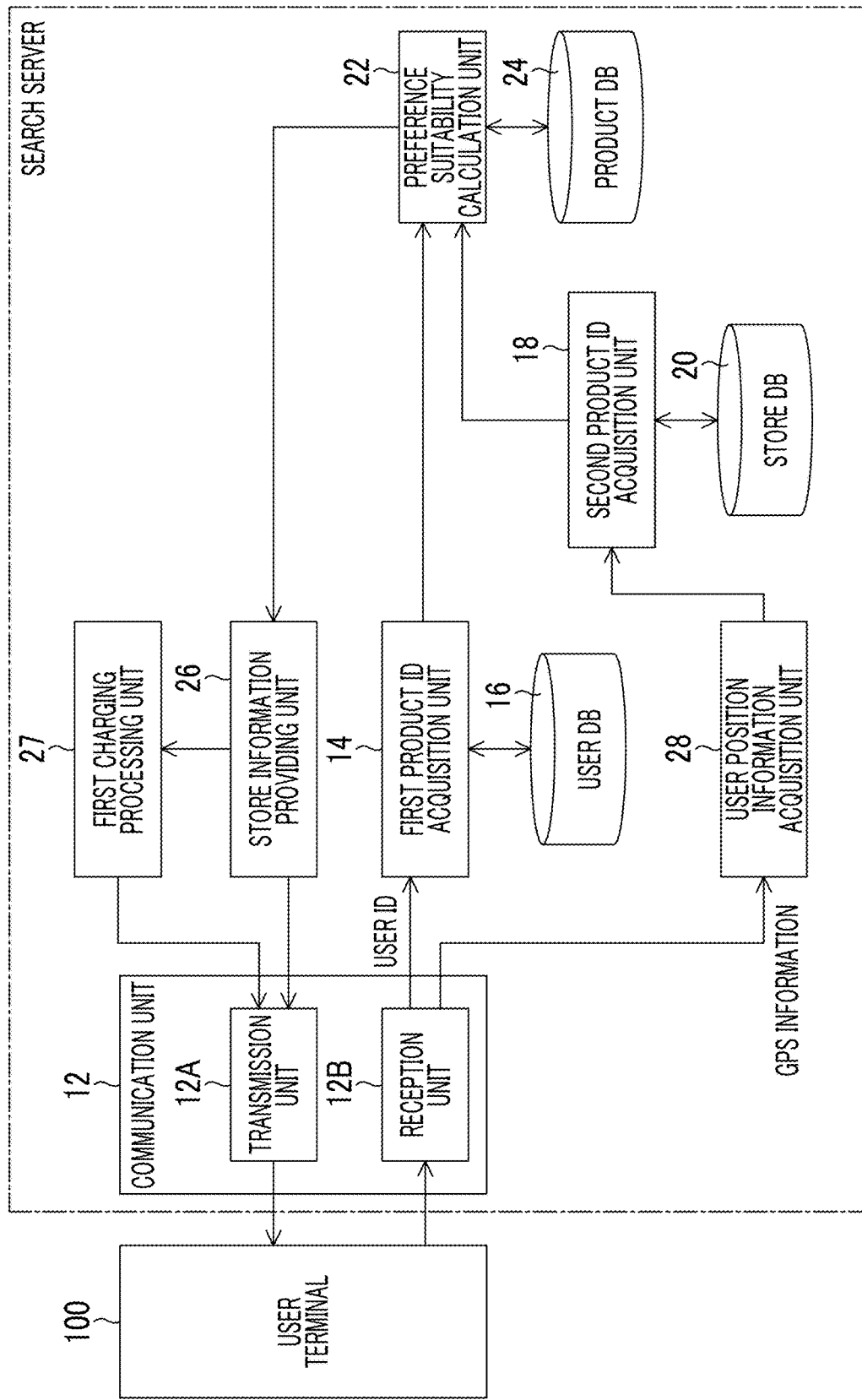
FIG. 14 is a block diagram showing an example of the functional configuration of a search server of a second embodiment.

FIG. 14 is a block diagram showing an example of the functional configuration of a search server 10-2 of a second embodiment. In FIG. 14, the same portions as in the search server 10 of the first embodiment shown in FIG. 2 are denoted by the same reference numerals, and the detailed description thereof will be omitted.

The search server 10-2 of the second embodiment is different from the search server 10 of the first embodiment mainly in that a user location information acquisition unit 28 is added and a real store is searched for.

The communication unit 12 (reception unit 12B) of the search server 10-2 receives the user ID, which is transmitted from the user terminal 100 through the network 2, and a search request for making a request for a search of a real store handling a large number of user's (his or her) favorite products, and receives GPS information.

The user location information acquisition unit 28 acquires the GPS information, as location information of the user indicating the current location of the user, from the user terminal 100 through the reception unit 12B.

The second product ID acquisition unit 18 acquires the second product ID, which is registered so as to be associated with the store ID of each store, from the store DB 20. In the second embodiment, however, a store located within a preset distance from the current location of the user specified by the GPS information is set as a search target store based on the GPS information input from the user location information acquisition unit 28, and a second product ID indicating the second product handled by the store corresponding to the store ID is acquired based on the store ID set for each search target store.

That is, the second product ID acquisition unit 18 of the second embodiment narrows down stores, which are located within a preset distance from the current location of the user specified by the GPS information, as search target stores based on the GPS information input from the user location information acquisition unit 28, and acquires a second product ID indicating the second product handled by each store for each narrowed-down store.

Here, the preset distance may be, for example, a fixed distance of several kilometers, or may be appropriately set by the user. In addition, location information (preferably, GPS information) indicating the location of each store (real store) is registered in the store DB 20 functioning as a store location information storage unit.

According to the second embodiment, since a store (real store) within a preset distance from the current location of the user is introduced, there is an advantage that it is easy to visit the introduced store.

Search Server of a Third Embodiment

Figure 15:
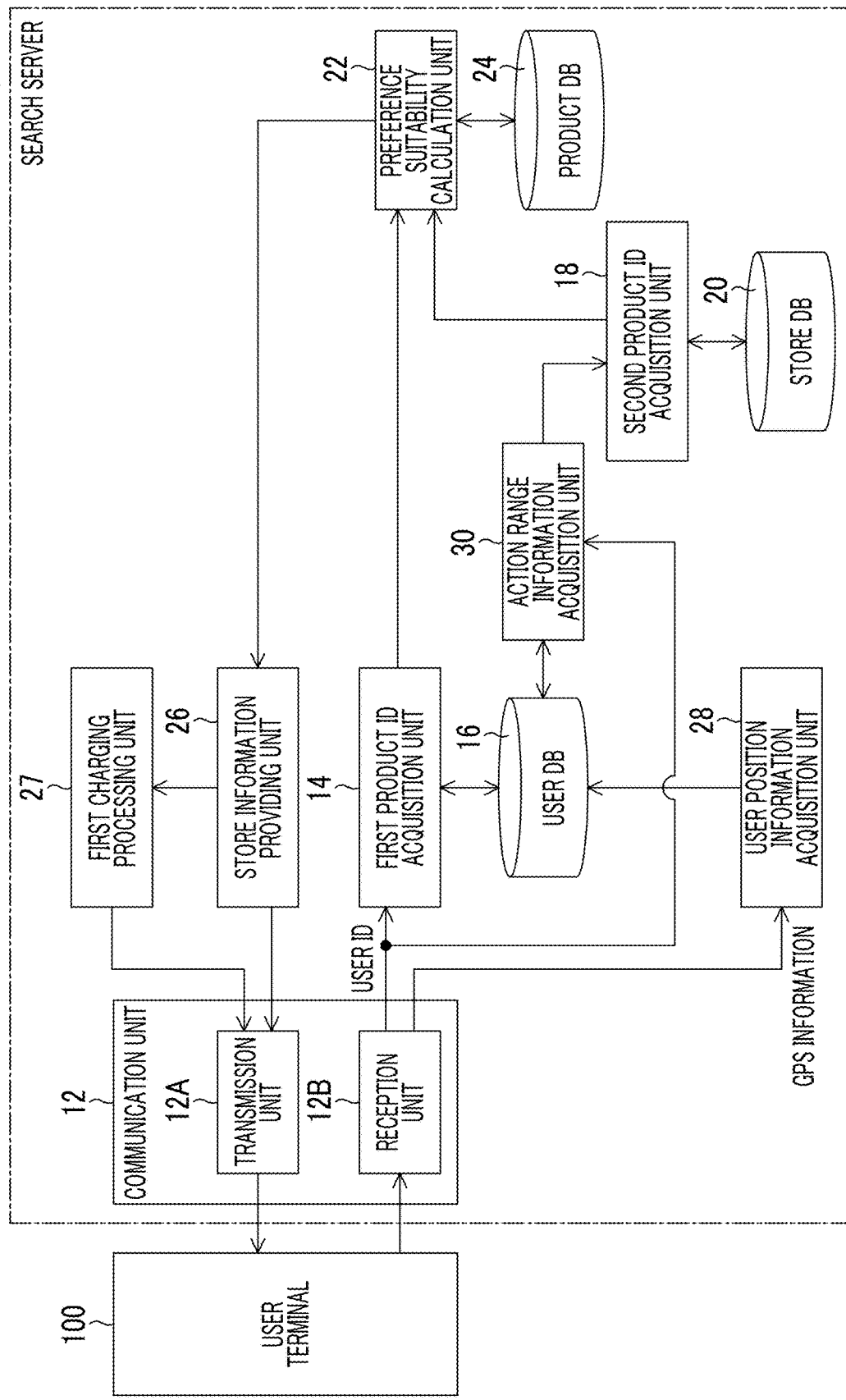
FIG. 15 is a block diagram showing an example of the functional configuration of a search server of a third embodiment.

FIG. 15 is a block diagram showing an example of the functional configuration of a search server 10-3 of a third embodiment. In FIG. 15, the same portions as in the search server 10 of the first embodiment shown in FIG. 2 are denoted by the same reference numerals, and the detailed description thereof will be omitted.

The search server 10-3 of the third embodiment is different from the search server 10 of the first embodiment mainly in that a user location information acquisition unit 28 and an action range information acquisition unit 30 are added and a real store is searched for.

The communication unit 12 (reception unit 12B) of the search server 10-3 receives the user ID, which is transmitted from the user terminal 100 through the network 2, and a search request for making a request for a search of a real store handling a large number of user's (his or her) favorite products, and receives GPS information.

The user location information acquisition unit 28 periodically acquires the GPS information, as location information of the user indicating the current location of the user, from the user terminal 100 through the reception unit 12B.

The search server 10-3 can generate action range information indicating the action range (for example, a commuting or school route, or a shopping range) of a normal user based on the GPS information periodically acquired by the user location information acquisition unit 28. The action range information for each user is registered in the user DB 16.

The action range information acquisition unit 30 acquires the action range information, which indicates the action range of the user corresponding to the user ID, from the user DB 16 based on the user ID input from the reception unit 12B, and outputs the acquired action range information to the second product ID acquisition unit 18.

The second product ID acquisition unit 18 acquires the second product ID, which is registered so as to be associated with the store ID of each store, from the store DB 20. In the third embodiment, however, a store located within the action range of the user among stores (real stores) registered in the store DB 20 is set as a search target store based on the action range information input from the action range information acquisition unit 30, and the second product ID indicating the second product handled by the store corresponding to the store ID is acquired based on the store ID set for each search target store.

That is, the second product ID acquisition unit 18 of the third embodiment narrows down stores, which are located within the normal user action range, as search target stores based on the action range information input from the action range information acquisition unit 30, and acquires a second product ID indicating the second product handled by each store for each narrowed-down store.

For example, in a case where the action range of the user is a commuting or school route, "within the action range of the user" is assumed to include "within a range to which it is possible to move on foot from the nearest station on the route".

According to the third embodiment, since a store (real store) located within the action range of the user is introduced, there is an advantage that it is easy to visit the introduced store.

Search Server of a Fourth Embodiment

Figure 16:
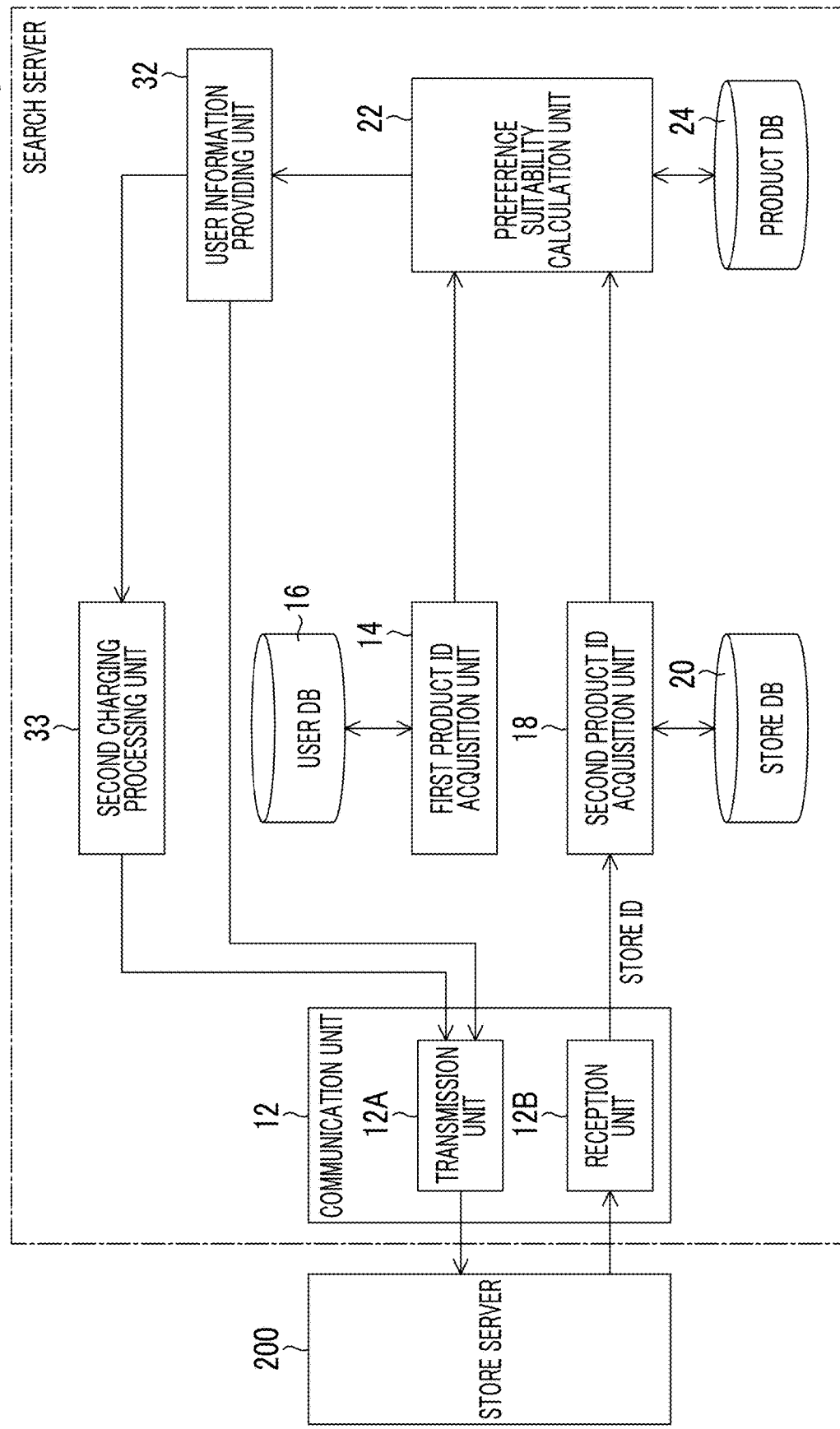
FIG. 16 is a block diagram showing an example of the functional configuration of a search server of a fourth embodiment.

FIG. 16 is a block diagram showing an example of the functional configuration of a search server 10-4 of a fourth embodiment. In FIG. 16, the same portions as in the search server 10 of the first embodiment shown in FIG. 2 are denoted by the same reference numerals, and the detailed description thereof will be omitted.

The search server 10-4 of the fourth embodiment has a function of providing one user with information of a store handling a large number of his or her favorite products similar to the search servers of the first to third embodiments. However, in FIG. 16, as will be described in detail below, only one configuration for providing one store (store server 200) with information of a user having a high preference suitability for a product handled by the store is described.

In FIG. 16, the first product ID acquisition unit 14 of the search server 10-4 of the fourth embodiment acquires a first product ID, which is registered so as to be associated with the user ID, from the user DB 16 for each user ID of all the users.

The communication unit 12 (reception unit 12B) functioning as a store identification information receiving unit receives a store ID of a store relevant to the store server 200 and a search request, which is for making a request for a search of a user having a high preference suitability for a product of the store, from the store server 200, and outputs the received store ID to the second product ID acquisition unit 18. The second product ID acquisition unit 18 of the search server 10-4 of the fourth embodiment acquires a second product ID, which is registered so as to be associated with the store ID, from the store DB 20 based on the input store ID.

That is, the first product ID acquisition unit 14 of the search server 10 of the first embodiment is different from the first product ID acquisition unit 14 of the search server 10-4 of the fourth embodiment in that the first product ID acquisition unit 14 of the search server 10 of the first embodiment acquires the first product ID, which is registered so as to be associated with the user ID, of one user who makes a request for a search of a store handling a large number of his or her favorite products, while the first product ID acquisition unit 14 of the search server 10-4 of the fourth embodiment acquires the first product ID for each user ID of all the users.

That is, the second product ID acquisition unit 18 of the search server 10 of the first embodiment is different from the second product ID acquisition unit 18 of the search server 10-4 of the fourth embodiment in that the second product ID acquisition unit 18 of the search server 10 of the first embodiment acquires the second product ID for each store ID of all the stores while the second product ID acquisition unit 18 of the search server 10-4 of the fourth embodiment acquires the second product ID registered so as to be associated with the store ID of one store (store that makes a request for a search of a user).

The preference suitability calculation unit 22 of the search server 10-4 of the fourth embodiment is different from the preference suitability calculation unit 22 of the search server 10 of the first embodiment in that the preference suitability calculation unit 22 of the search server 10-4 of the fourth embodiment calculates the preference suitability between the user's preference and the preference of the store for each user based on the first product corresponding to the first product ID input from the first product ID acquisition unit 14 and the second product corresponding to the second product ID input from the second product ID acquisition unit 18 while the preference suitability calculation unit 22 of the search server 10 of the first embodiment calculates the preference suitability for each store.

The preference suitability for each store and each user calculated by the preference suitability calculation unit 22 is output to a user information providing unit 32.

The user information providing unit 32 extracts (searches for) one user or two or more users having higher preference suitabilities based on the preference suitability for each user input from the preference suitability calculation unit 22, and transmits the information of the searched one user or two or more users to the store server 200 through the transmission unit 12A. The information of the user to be transmitted is information necessary for introducing the product of each store to the user, and includes the user's mail address, user ID, and the like.

In a case where the user information from the user information providing unit 32 is provided to the store, the second charging processing unit 33 charges a fee to the store to which the user information has been provided. For example, the second charging processing unit 33 counts the number of times of providing the user information in a predetermined period (one week or one month) for each store, and charges a fee to the store according to the counting result. This charging is a fee for introducing the user to the store. The charging information may be transmitted to the store server 200, or may be separately transmitted to the store.

According to the fourth embodiment, the store server 200 can acquire the information of a user, which has a high preference suitability for a product handled by each store, through the search server 10-4.

[Others]

The first product ID acquisition unit 14 acquires all the first product IDs registered corresponding to the user ID, but the invention is not limited thereto. The first product ID acquisition unit 14 may acquire the first product ID corresponding to any one type of history information among types of purchase action history information (history information of products registered as favorites, history information of products displayed in detail, history information of products put in the cart, and history information of products registered in my closet) of the user. Alternatively, the first product ID acquisition unit 14 may acquire the first product ID by limiting the number of first product IDs to a certain number to the extent that the user's preference can be estimated (preferably, a certain number corresponding to the latest purchase action history of the user).

The second product ID acquisition unit 18 acquires product IDs of all the products handled by one store corresponding to the store ID (that is, all the second product IDs registered in the store DB 20 corresponding to the store ID), but the invention is not limited thereto. The second product ID acquisition unit 18 may acquire second product IDs including any one or more products among a second product ID indicating a product being sold in the store corresponding to the store ID, a second product ID indicating a product to be sold, and a second product ID indicating a product on a bargain sale. Alternatively, the second product ID acquisition unit 18 may acquire the second product ID by limiting the number of second product IDs to a certain number to the extent that the preference of the store can be estimated (preferably, a certain number by which the registration time of a product in the product DB 24 is new).

It is needless to say that the invention is not limited to the embodiments described above and various modifications can be made within the scope not deviating from the spirit of the invention.

EXPLANATION OF REFERENCES

1: search system
2: network
10: search server
12: communication unit
12A: transmission unit
12B: reception unit
14: first product ID acquisition unit
16: user DB
18: second product ID acquisition unit
20: store DB
22: preference suitability calculation unit
24: product DB
26: store information providing unit
27: first charging processing unit
28: user location information acquisition unit
30: action range information acquisition unit
32: user information providing unit
33: second charging processing unit
100, 100a, 100b: user terminal (smartphone)
110: radio communication unit
140: operation unit
170: GPS receiving unit
120: display input unit
200, 200a, 200b: store server

What is claimed is:

1. A search method, comprising:
acquiring, based on user identification information set for each user, first product identification information indicating a first product relevant to purchase action history information of a user corresponding to the user identification information;
acquiring, based on store identification information set for each store, second product identification information indicating a second product handled by a store corresponding to the store identification information; and
calculating, by a processor, a preference suitability between a preference of the user and a preference of the store based on the first product corresponding to the first product identification information and the second product corresponding to the second product identification information,
wherein the first product identification information indicating "m" first products is acquired assuming that m is an integer of 2 or more,
the second product identification information indicating "n" second products is acquired assuming that n is an integer of 2 or more, and
"m×n" similarities between "m" first design feature amounts obtained by analyzing product images showing the "m" first products and "n" second design feature amounts obtained by analyzing product images showing the "n" second products is calculated, and an average value of the calculated "m×n" similarities is set as the preference suitability.

2. A search method, comprising:
acquiring, based on user identification information set for each user, first product identification information indicating a first product relevant to purchase action history information of a user corresponding to the user identification information;
acquiring, based on store identification information set for each store, second product identification information indicating a second product handled by a store corresponding to the store identification information; and
calculating, by a processor, a preference suitability between a preference of the user and a preference of the store based on the first product corresponding to the first product identification information and the second product corresponding to the second product identification information,
wherein the first product identification information indicating "m" first products is acquired assuming that m is an integer of 2 or more,
the second product identification information indicating "n" second products is acquired assuming that n is an integer of 2 or more, and
a first statistic amount of "m" first design feature amounts obtained by analyzing product images showing the "m" first products and a second statistic amount of "n" second design feature amounts obtained by analyzing product images showing the "n" second products is calculated, and a similarity between the calculated first statistic amount and the calculated second statistic amount is set as the preference suitability.

3. The search method according to claim 2, further comprising:
receiving user identification information of the user; and
providing information of stores, which handle a large number of products matching a preference of the user,
wherein the first product identification information is acquired based on the received user identification information of the user,
the second product identification information, which indicates a second product handled by each of a plurality of stores, for each of the stores is acquired,
a preference suitability between a preference of the user and a preference of each of the plurality of stores based on a first product corresponding to the first product identification information and a second product corresponding to the second product identification information for each of the plurality of stores is calculated, and one store or two or more stores having higher preference suitabilities is searched for, among the plurality of stores, based on the calculated preference suitability, and information of the searched store is provided.

4. The search method according to claim 3, wherein the first product identification information, which is registered so as to be associated with the user identification information of the user, is acquired from a user database based on the received user identification information of the user.

5. The search method according to claim 2, further comprising:

receiving store identification information of the store; and providing the store with information of users having high preference suitabilities for a product handled by the store, wherein the first product identification information is acquired based on user identification information of each of a plurality of users for each of the users, the second product identification information is acquired based on the received store identification information of the store, a preference suitability between a preference of each of the plurality of users and a preference of the store based on a first product corresponding to the first product identification information for each of the plurality of users and a second product corresponding to the second product identification information of the store is calculated, and one user or two or more users having higher preference suitabilities is searched for, among the plurality of users, based on the calculated preference suitability, and information of the searched user is provided.

6. The search method according to claim 5, wherein the second product identification information, which is registered so as to be associated with the store identification information of the store, is acquired from the store database based on the received store identification information of the store.

7. The search method according to claim 2, wherein the purchase action history information of the user includes one or more pieces of history information among history information obtained as a result of selecting a product and putting the selected product in an online shopping cart, history information obtained as a result of selecting a product and registering the selected product in a favorites list, history information obtained as a result of selecting a product and browsing detailed display of the selected product, and history information obtained as a result of selecting a product and registering the selected product in my closet.

8. The search method according to claim 2, wherein the second product handled by the store includes one or more products among a product being sold in the store, a product to be sold, and a product on a bargain sale.

9. The search method according to claim 2, wherein each of the first design feature amount and the second design feature amount is one or more feature amounts among a color feature amount, a pattern feature amount, a shape feature amount, and a texture feature amount obtained by analyzing product images indicating the first product and the second product.

10. The search method according to claim 2, wherein each of the first design feature amount and the second design feature amount is a sensibility feature amount for specifying an impression of the first product and the second product, the sensibility feature amount being associated with one or more feature amounts among a color feature amount, a pattern feature amount, a shape feature amount, and a texture feature amount obtained by analyzing product images indicating the first product and the second product.

11. The search method according to claim 2, wherein the first design feature amount and the second design feature amount corresponding to the first product identification information and the second product identification information are acquired, and a similarity between the acquired first design feature amount and the acquired second design feature amount is calculated.

12. The search method according to claim 3, further comprising:

charging a fee to a store whose information is provided to the user in a case where the information of the store is provided to the user.

13. The search method according to claim 5, further comprising:

charging a fee to a store, to which information of the user is provided, in a case where the information of the user is provided to the store.

14. The search method according to claim 3, further comprising:

acquiring location information of the user; and storing location information of the plurality of stores, wherein a store located within a preset distance from the user is set, among the plurality of stores, as a search target store based on the acquired location information of the user and the location information of the plurality of stores, and second product identification information indicating a second product handled by a store corresponding to the store identification information is acquired based on store identification information set for each search target store.

15. The search method according to claim 3, further comprising:

acquiring action range information indicating an action range of the user; and storing location information of the plurality of stores, wherein a store located within the action range of the user, among the plurality of stores, is set as a search target store based on the acquired action range information of the user and the location information of the plurality of stores, and second product identification information indicating a second product handled by a store corresponding to the store identification information is acquired based on store identification information set for each search target store.

* * * * *